US010184036B2

(12) United States Patent
Isayama et al.

(10) Patent No.: US 10,184,036 B2
(45) Date of Patent: Jan. 22, 2019

(54) COMPOSITE RESIN PRE-EXPANDED PARTICLES CONTAINING CARBON BLACK AND METHOD FOR PRODUCING SAME, AND EXPANDED MOLDED ARTICLE

(71) Applicant: SEKISUI PLASTICS CO., LTD., Osaka (JP)

(72) Inventors: Akira Isayama, Shiga (JP); Masahiko Ozawa, Shiga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 182 days.

(21) Appl. No.: 15/023,005

(22) PCT Filed: Sep. 11, 2014

(86) PCT No.: PCT/JP2014/074087
§ 371 (c)(1),
(2) Date: Mar. 18, 2016

(87) PCT Pub. No.: WO2015/045885
PCT Pub. Date: Apr. 2, 2015

(65) Prior Publication Data
US 2016/0229971 A1 Aug. 11, 2016

(30) Foreign Application Priority Data

Sep. 30, 2013 (JP) .................................. 2013-205307
Mar. 28, 2014 (JP) .................................. 2014-069217

(51) Int. Cl.
C08J 9/00 (2006.01)
C08J 9/14 (2006.01)
(Continued)

(52) U.S. Cl.
CPC ............ *C08J 9/0066* (2013.01); *C08J 9/0014* (2013.01); *C08J 9/0019* (2013.01); *C08J 9/0028* (2013.01);
(Continued)

(58) Field of Classification Search
CPC . C08J 9/0066; C08J 9/0014; C08J 9/22; C08J 9/232; C08J 9/18; C08J 2325/06; C08J 2423/12
See application file for complete search history.

(56) References Cited

U.S. PATENT DOCUMENTS

2004/0039073 A1    2/2004  Gluck
2004/0254254 A1*  12/2004  Hashimoto ............ C08J 9/0061
                                                      521/57

(Continued)

FOREIGN PATENT DOCUMENTS

CN      101636423 A    1/2010
JP      2005-506390    3/2005
(Continued)

OTHER PUBLICATIONS

International Search Report issued in PCT Application No. PCT/JP2014/074087, dated Dec. 16, 2014.

*Primary Examiner* — Hai Vo
(74) *Attorney, Agent, or Firm* — Greenblum & Bernstein, P.L.C.

(57) ABSTRACT

Carbon black-containing composite resin pre-expanded particles
comprising 100 to 400 parts by mass of a polystyrene-based resin with respect to 100 parts by mass of a carbon black-containing polyolefin-based resin;
having a carbon black content of 0.5 to 5.0% by mass and a bulk density of 0.015 to 0.25 $g/cm^3$; and
having an outermost layer of 30 to 80 pm after undergoing the following tests:
(Continued)

(a) one of the carbon black-containing composite resin pre-expanded particles is sliced into a 1-mm slice in such a way that cross-section surfaces of cells are exposed on both surfaces of the slice;
(b) the obtained slice is immersed in toluene at 25° C. for 24 hours to extract a polystyrene-based resin component as described above;
(c) the cross-section surface of the slice is then subjected to magnified photographing by a microscope;
(d) the obtained microscope image is observed.

8 Claims, 3 Drawing Sheets

(51) Int. Cl.
    *C08J 9/18*     (2006.01)
    *C08J 9/22*     (2006.01)
    *C08J 9/232*     (2006.01)

(52) U.S. Cl.
    CPC .......... *C08J 9/0033* (2013.01); *C08J 9/0061* (2013.01); *C08J 9/0095* (2013.01); *C08J 9/141* (2013.01); *C08J 9/18* (2013.01); *C08J 9/22* (2013.01); *C08J 9/232* (2013.01); *C08J 2201/034* (2013.01); *C08J 2203/14* (2013.01); *C08J 2203/182* (2013.01); *C08J 2325/06* (2013.01); *C08J 2423/06* (2013.01); *C08J 2423/08* (2013.01); *C08J 2423/12* (2013.01)

(56) References Cited

U.S. PATENT DOCUMENTS

| | | |
|---|---|---|
| 2010/0063170 A1 | 3/2010 | Ishida et al. |
| 2012/0041085 A1* | 2/2012 | Tsutsui ................. C08J 9/0061 521/56 |

FOREIGN PATENT DOCUMENTS

| | | | |
|---|---|---|---|
| JP | 2008-133449 | 6/2008 | |
| JP | 2010-222546 | 10/2010 | |
| JP | 4917511 | 4/2012 | |
| JP | 2013-117037 | 6/2013 | |
| WO | WO-2010101145 A1 * | 9/2010 | ............ C08J 9/0061 |

* cited by examiner

COMPOSITE RESIN PRE-EXPANDED PARTICLES CONTAINING CARBON BLACK AND METHOD FOR PRODUCING SAME, AND EXPANDED MOLDED ARTICLE

TECHNICAL FIELD

The present invention relates to composite resin pre-expanded particles containing carbon black (carbon black-containing composite resin pre-expanded particles) and a method for producing the same, and an expanded molded article. The present invention can provide the carbon black-containing composite resin pre-expanded particles having a specific structure of an outermost layer and having further improved blackness, the production method thereof, and the expanded molded article obtained by using these particles.

BACKGROUND ART

Expanded molded articles comprising a polystyrene-based resin have been frequently used as packaging materials or thermal insulating materials because such expanded molded articles have excellent shock-absorbing and thermal insulating properties and are readily formable. These expanded molded articles are, however, insufficient in impact resistance and in plasticity and thus become cracked or chipped easily; therefore, these expanded molded articles are not suited for packaging some items such as precision apparatuses.

On the other hand, expanded molded articles comprising a polyolefin-based resin are excellent in impact resistance and in plasticity but require large-scale equipment at a time of molding these expanded molded articles. Moreover, because of its properties, the polyolefin-based resin needs to be transported in the form of pre-expanded particles from a raw material maker to a molding and processing maker. Since the pre-expanded particles that are bulky need to be transported, some problems arise such as high production costs.

Because of these reasons, various polystyrene-based composite resin particles having the different merits of the above-described two resins and expanded molded articles using these resin particles have been suggested.

Depending on their usage, it is desired that the expanded molded articles are black; and used as a colorant is mainly carbon black.

For example, Japanese Unexamined Patent Application Publication No. 2010-222546 (Patent Document 1) discloses carbon black-containing modified polystyrene-based resin pre-expanded particles that are obtained by pre-expanding carbon black-containing expandable modified polystyrene-based resin particles, in which a blowing agent is immersed, in carbon black-containing modified polystyrene-based resin particles comprising 100 to 400 parts by mass of a polystyrene-based resin with respect to 100 parts by mass of a carbon black-containing polypropylene-based resin, in bulk expansion ratio of 20 to 45, and that have an outermost layer thickness of 5 to 25 μm calculated from an image observed with a scanning electron microscope and have cells having an average cell diameter of 100 to 600 μm, the cells coming in contact with the outermost layer of the pre-expanded particles calculated from the image observed with the scanning electron microscope.

An expanded molded article obtained by expanding and molding these pre-expanded particles in a cavity is regarded as improving thermal resistance and blackness compared to conventional products.

Japanese Patent No. 4,917,511 (Patent Document 2) discloses expandable polystyrene-based resin particles, in which 140 to 600 parts by mass of a styrene-based monomer is immersed and polymerizes with respect to 100 parts by mass of polyolefin-based resin particles, that are divided into two halves from a surface of the resin particles through the center so as to immerse the halved particles in tetrahydrofuran and to extract a polystyrene-based resin component and that are observed to be 15 to 150 μm in average thickness of an epidermal layer observed in an image photographed by a scanning electron microscope and to be 800 to 2,400 μm in average particle diameter.

These expandable polystyrene-based resin particles are regarded as having a core-shell structure having the epidermal layer (shell) and as maintaining high expandability for long periods of time because of good capability of retaining a blowing agent and also as being capable of forming an expanded molded article excellent in crack resistance despite a low combination ratio of the polyolefin-based resin.

CITATION LIST

Patent Literatures

Patent Document 1: Japanese Unexamined Patent Application Publication No. 2010-222546
Patent Document 2: Japanese Patent No. 4917511

SUMMARY OF INVENTION

Technical Problems

The expanded molded articles of the prior art obtained by expanding and molding the pre-expanded particles as described above are insufficient in blackness; therefore, it is desired that these articles are further improved.

The pre-expanded particles of Patent Document 1 are 5 to 25 μm in outermost layer thickness; and the inventors of the present invention found the following by measuring the expanded molded article obtained by expanding and molding the pre-expanded particles of Patent Document 1: A fused-layer thickness of a slice of the expanded molded article was thin, such as 78 μm; and the expanded molded article was insufficient in blackness, such as 30.5.

The resin particles of Patent Document 2 are 15 to 150 μm in average thickness of the epidermal layer; and the inventors of the present invention found the following: The outermost layer thickness of the pre-expanded particles obtained by immersing and pre-expanding a blowing agent in these resin particles was thin, such as 12 μm; and a fused-layer thickness of a slice of the expanded molded article obtained by expanding and molding these pre-expanded particles was thin, such as 38 μm.

The present invention, therefore, solves the above-described problems and has an object of providing carbon black-containing composite resin pre-expanded particles having a specific structure of an outermost layer and having further improved blackness, a method for producing the same, and an expanded molded article obtained by using these particles.

Solution to Problems

As a result of considerable deliberation, the inventors of the present invention found the following and achieved the present invention: In the case where the pre-expanded particles have the specific structure of the outermost layer—namely, in the case where one of the pre-expanded particles is subjected to slice processing so as to obtain a 1-mm slice, and the slice is immersed in toluene for 24 hours at 25° C. so that the outermost layer of the pre-expanded particle is 30 to 80 μm in thickness—further in the case where one of the pre-expanded particles is expanded and molded and then is subjected to slice processing so as to obtain a 1-mm slice, and the slice is immersed in toluene for 24 hours at 25° C. in such a way that a layer thickness is 100 to 200 μm at an interface between the fused pre-expanded particles of the expanded molded article, the expanded molded article obtained by expanding and molding these pre-expanded particles exerts excellent blackness.

The present invention, therefore, provides carbon black-containing composite resin pre-expanded particles
comprising 100 to 400 parts by mass of a polystyrene-based resin with respect to 100 parts by mass of a carbon black-containing polyolefin-based resin;
having a carbon black content of 0.5 to 5.0% by mass and a bulk density of 0.015 to 0.25 g/cm$^3$; and
having an outermost layer of 30 to 80 μm after undergoing the following tests:
(a) one of the carbon black-containing composite resin pre-expanded particles is sliced into a 1-mm slice in such a way that cross-section surfaces of cells are exposed on both surfaces of the slice;
(b) the obtained slice is immersed in toluene at 25° C. for 24 hours to extract a polystyrene-based resin component as described above;
(c) the cross-section surface of the slice is then subjected to magnified photographing by a microscope;
(d) the obtained microscope image is observed.

The present invention also provides an expanded molded article obtained by expanding and molding the carbon black-containing composite resin pre-expanded particles.

The present invention further provides a method for producing the carbon black-containing composite resin pre-expanded particles, the method comprising the successive steps of:
(A) obtaining a suspension by dispersing carbon black-containing polyolefin-based resin particles in an aqueous medium comprising a dispersant;
(B) adding a styrene-based monomer and a polymerization initiator to the obtained suspension, heating the mixture to a temperature that does not substantially allow polymerization of the styrene-based monomer, and immersing the styrene-based monomer in the carbon black-containing polyolefin-based resin particles to obtain a reaction solution;
(C) heating the obtained reaction solution to temperatures of (T−10)° C. to (T+20)° C., in which T° C. indicates a melting point of a polyolefin-based resin in the carbon black-containing polyolefin-based resin particles, so as to polymerize the styrene-based monomer, and
repeating these processes three times or more to obtain carbon black-containing composite resin particles;
(D) immersing a blowing agent in the obtained carbon black-containing composite resin particles to obtain expandable carbon black-containing composite resin particles; and
(E) heating and pre-expanding the obtained expandable carbon black-containing composite resin particles in an reaction vessel by introducing a gauge pressure 0.004 to 0.09 MPa of steam so as to obtain carbon black-containing composite resin pre-expanded particles.

Advantageous Effects of Invention

The present invention can provide carbon black-containing composite resin pre-expanded particles having a specific structure of an outermost layer and having further improved blackness, a method for producing the same, and an expanded molded article obtained by using these particles. The carbon black-containing composite resin pre-expanded particles of the present invention exert the blackness as well as excellent thermal resistance.

The carbon black-containing composite resin pre-expanded particles of the present invention further exert the above-described effects in the case where the carbon black-containing composite resin pre-expanded particles meet at least one of the following conditions:
(1) the carbon black-containing composite resin pre-expanded particles have a surface polystyrene-based resin content of 5 to 50% by mass;
(2) the carbon black-containing composite resin pre-expanded particles are 100 to 600 μm in average cell diameter;
(3) the carbon black-containing composite resin pre-expanded particles comprise, as a flame retardant, 1.5 to 6.0 parts by mass of tri(2,3-dibromopropyl)isocyanate or bis[3,5-dibromo-4-(2,3-dibromopropoxy)phenyl]sulfone with respect to 100 parts by mass of the carbon black-containing composite resin pre-expanded particles and further comprise, and as a flame-retardant auxiliary agent, 0.1 to 2.0 parts by mass of 2,3-dimethyl-2,3-diphenyl butane with respect to 100 parts by mass of the carbon black-containing composite resin pre-expanded particles; and
(4) the carbon black-containing composite resin pre-expanded particles have a carbon black content of 0.5 to 2.5% by mass, a bulk density of 0.015 to 0.035 g/cm$^3$, and an outermost layer of 30 to 45 μm as a result of the tests. The carbon black-containing composite resin pre-expanded particles exert excellent blackness, chemical resistance, and crack resistance particularly under the condition (1) and exert excellent late-retardancy particularly under the condition (2).

The expanded molded article of the present invention further exerts the above-described excellent effects in the case where the expanded molded article meets at least one of the following conditions:
(5) the expanded molded article meets a relation formula represented by $$\Delta E' = L^* + |a^*| + |b^*| < 30$$

wherein ΔE' indicates blackness, L* indicates intensity, and a* and b* indicate color coordinates, in accordance with a color-difference measurement based on JIS Z8729-2004 "color specification—CIELAB and CIELUV color spaces" and
meets a relation of σ<1.0 wherein o indicates a standard deviation of the blackness ΔE';
(6) the expanded molded article has a layer having a thickness of 100 to 200 μm at an interface between fused outermost layers of the carbon black-containing composite resin pre-expanded particles after undergoing the following tests:
(a') the surface of the expanded molded article is sliced into a 1-mm slice;
(b') the obtained slice is immersed in toluene at 25° C. for 24 hours to extract a polystyrene-based resin component as described above;
(c') the cross-section surface of the slice is then subjected to magnified photographing by a microscope;
(d') the obtained microscope image is observed; and (7) the expanded molded article has a layer having a thickness of 105 to 165 µm at the interface between the fused outermost layers of the carbon black-containing composite resin pre-expanded particles.

Figure 1:
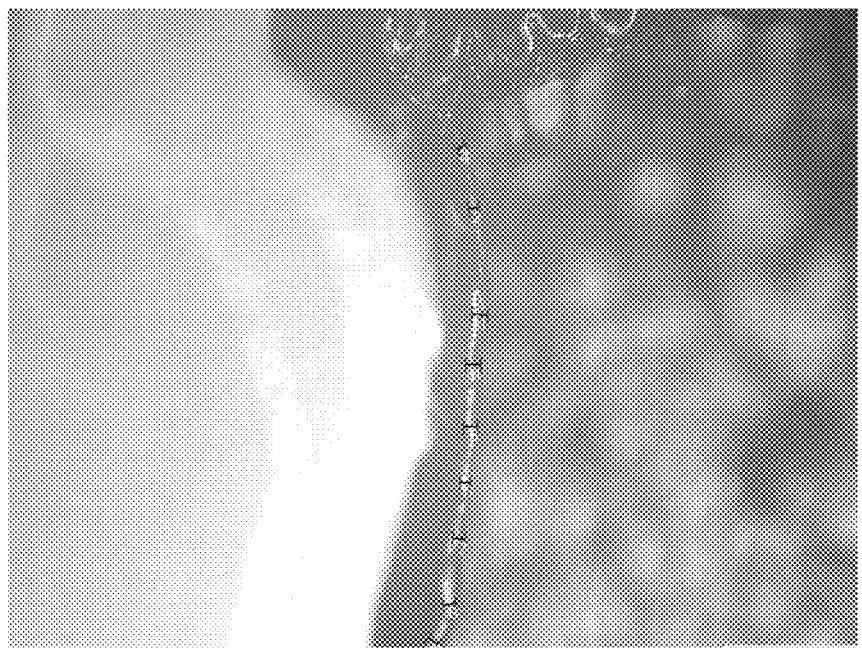
FIG. 1 exhibits a microscope image indicating measurement results of an outermost layer thickness of a slice of an expanded molded article obtained by expanding and molding pre-expanded particles of Example 1.

DESCRIPTION OF EMBODIMENTS (1) Carbon Black-containing Composite Resin Pre-expanded Particles Carbon black-containing composite resin pre-expanded particles of the present invention (hereinafter also referred to as "composite resin pre-expanded particles")

comprise 100 to 400 parts by mass of a polystyrene-based resin with respect to 100 parts by mass of a carbon black-containing polyolefin-based resin;

have a carbon black content of 0.5 to 5.0% by mass and a bulk density of 0.015 to 0.25 $g/cm^3$; and are characterized by having an outermost layer of 30 to 80 µm after undergoing the following tests:

(a) one of the carbon black-containing composite resin pre-expanded particles is sliced into a 1-mm slice in such a way that cross-section surfaces of cells are exposed on both surfaces of the slice;

(b) the obtained slice is immersed in toluene at 25° C. for 24 hours to extract a polystyrene-based resin component as described above;

(c) the cross-section surface of the slice is then subjected to magnified photographing by a microscope;

(d) the obtained microscope image is observed.

1 mm in thickness of the slice does not mean in a strict sense, and this is allowed to have some error as long as the outermost layer is observable. The thickness may vary in the order of 1±0.5 mm, and the present specification occasionally uses the word "about."

The inventors of the present invention ascertain that the above-described numerical ranges of the limited properties have a correlation with the distribution of the carbon black—more specifically the composite resin pre-expanded particles having the above-described numerical ranges of the properties are likely to distribute the carbon black throughout a surface thereof and improve blackness even if a carbon black content is low.

The numerical ranges of the properties have the following relations with the blackness and bring about optimal values on the basis of these relations.

The lower the polystyrene-based resin content is, the higher the blackness is; however, the polystyrene-based resin content being too low may deteriorate stiffness and capability of retaining a blowing agent, leading to low expandability in some situations.

The higher the carbon black content is, the higher the blackness is; however, the carbon black content being too high may cause late-retardancy to worsen.

The higher the bulk density is, the higher the blackness is; however, the bulk density being too high may cause an expanded molded article to have less merit in functioning as a foam.

The thicker the outermost layer is, the higher the blackness is; however, the outermost layer being too thick may cause an article to worsen its stretch at the time of being molded.

(a) Carbon Black Content

The composite resin pre-expanded particles of the present invention have the carbon black content of 0.5 to 5.0% by mass.

If the carbon black content in the composite resin pre-expanded particles is lower than 0.5% by mass, blackness of an expanded molded article may become insufficient. On the other hand, if the carbon black content in the composite resin pre-expanded particles exceeds 5.0% by mass, it may be difficult to secure flame retardancy of an expanded molded article.

The carbon black content (% by mass) is, for example, 0.5, 0.75, 1.0, 1.25, 1.5, 1.6, 1.7, 1.8, 1.9, 2.0, 2.1, 2.2, 2.3, 2.4, 2.5, 2.6, 2.7, 2.8, 2.9, 3.0, 3.25, 3.5, 3.75, 4.0, 4.25, 4.5, 4.75 or 5.0.

The lower limit of the carbon black content in the composite resin pre-expanded particles is preferably 0.5% by mass and more preferably 1.5% by mass; its upper limit is preferably 3.0% by mass and more preferably 2.5% by mass; and the carbon black content preferably ranges, for example, from 0.5 to 2.5% by mass or from 1.5 to 3.0% by mass.

(b) Bulk Density

The composite resin pre-expanded particles of the present invention have the bulk density of 0.015 to 0.25 $g/cm^3$.

If the bulk density of the composite resin pre-expanded particles is lower than 0.015 $g/cm^3$, an expanded molded article is likely to shrink; its appearance may be deteriorated; and its mechanical strength may become insufficient. A prescribed carbon black content may significantly deteriorate blackness of an expanded molded article. On the other hand, if the bulk density of the composite resin pre-expanded particles exceeds 0.25 $g/cm^3$, merit in reducing weight of an expanded molded article may deteriorate.

The bulk density ($g/cm^3$) is, for example, 0.015, 0.020, 0.025, 0.026, 0.027, 0.028, 0.029, 0.030, 0.031, 0.032, 0.033, 0.035, 0.04, 0.05, 0.10, 0.15, 0.20 or 0.25.

The composite resin pre-expanded particles are preferably 0.015 to 0.035 $g/cm^3$ in bulk density and more preferably 0.025 to 0.033 $g/cm^3$.

How to measure the bulk density will be detailed in Examples.

(c) Thickness of an Outermost Layer

One of the composite resin pre-expanded particles of the present invention is sliced into about a 1-mm-thick slice in such a way that cross-section surfaces of cells are exposed on both surfaces of the slice; the obtained slice is immersed in toluene for 24 hours at 25° C. to extract a polystyrene-based resin component as described above; the cross-section surface of the slice is photographed by a microscope; and 30 to 80 μm of an outermost layer is observed.

Namely, the carbon black-containing composite resin pre-expanded particles have the thickness of 30 to 80 μm after undergoing the following tests:

(a) one of the carbon black-containing composite resin pre-expanded particles is sliced into a 1-mm slice in such a way that cross-section surfaces of cells are exposed on both surfaces of the slice;

(b) the obtained slice is immersed in toluene at 25° C. for 24 hours to extract a polystyrene-based resin component as described above;

(c) the cross-section surface of the slice is then subjected to magnified photographing by a microscope;

(d) the obtained microscope image is observed.

If the outermost layer of the composite resin pre-expanded particles is less than 30 μm in thickness, blackness of an expanded molded article may become insufficient. On the other hand, if the outermost layer of the composite resin pre-expanded particles exceeds 80 μm, stretch of an article at the time of being molded may be deteriorated; therefore, a good expanded molded article may not be obtained.

The thickness (μm) of the outermost layer is, for example, 30, 35, 40, 45, 50, 55, 60, 65, 70, 75 or 80.

The industrial field where the present invention is used requires an expanded molded article being lightweight and having excellent blackness; therefore, the outermost layer of the composite resin pre-expanded particles is preferably 30 to 45 μm in thickness in consideration of the bulk density and the blackness of the composite resin pre-expanded particles.

How to measure the thickness of the outermost layer will be detailed in Examples.

It should be noted that the polystyrene-based resin, which is the extracted material, extracted by toluene may be confirmed by a publicly known method such as a gas chromatography.

To adjust the outermost layer to be 30 to 80 μm in thickness, a surface polystyrene-based resin content in the composite resin particles should range, for example, from 5 to 50% by mass; and the bulk density of the composite resin pre-expanded particles should range, for example, from 0.015 to 0.25 g/cm³. To adjust the surface polystyrene-based resin content in the composite resin particles, it is important to thoroughly immerse a styrene-based monomer in carbon black-containing polyolefin-based resin particles to polymerize the styrene-based monomer. More specifically, the immersion process and the polymerization process are repeated three times or more to polymerize the styrene-based monomer completely. The bulk density of the composite resin pre-expanded particles may be set to range from 0.015 to 0.25 g/cm³ by adjusting the time of pre-expanding particles, temperatures, or steam flow. The thickness may be increased by increasing the bulk density of the composite resin pre-expanded particles and may be decreased by decreasing the bulk density.

(d) Surface Polystyrene-based Resin Content

It is desirable that the composite resin pre-expanded particles of the present invention have the surface polystyrene-based resin content of 5 to 50% by mass.

If the surface polystyrene-based resin content in the composite resin pre-expanded particles is lower than 5% by mass, the polystyrene-based resin component may locally gush out of the particles at the time of pre-expanding the particles, leading to a poor appearance such as uneven blackness at the time of expanding and molding an article. On the other hand, if the surface polystyrene-based resin content in the composite resin pre-expanded particles exceeds 50% by mass, blackness of an expanded molded article may become insufficient; and chemical resistance and impact resistance of the expanded molded article may decrease at the same time.

The surface polystyrene-based resin content (% by mass) is, for example, 5, 10, 15, 20, 25, 30, 35, 40, 45 or 50.

The surface polystyrene-based resin content in the composite resin pre-expanded particles is preferably 5 to 30% by mass.

How to measure the surface polystyrene-based resin content will be detailed in Examples.

(e) Average Cell Diameter

It is desirable that the composite resin pre-expanded particles are 100 to 600 μm in average cell diameter.

If the average cell diameter of the composite resin pre-expanded particles is less than 100 μm, blackness of an expanded molded article may become insufficient. On the other hand, if the average cell diameter of the composite resin pre-expanded particles exceeds 600 μm, it may be difficult to secure flame retardancy of an expanded molded article.

The average cell diameter (μm) is, for example, 100, 150, 200, 225, 250, 275, 300, 325, 350, 375, 400, 450, 500, 550 or 600.

The composite resin pre-expanded particles are preferably 200 to 400 μm in average cell diameter.

How to measure the average cell diameter will be detailed in Examples.

(f) Carbon Black-containing Polyolefin-based Resin (PO)

The composite resin pre-expanded particles of the present invention may be obtained by pre-expanding expandable carbon black-containing composite resin particles (hereinafter also referred to as "expandable composite resin particles"), in which a blowing agent is immersed, in carbon black-containing composite resin particles comprising, for example, 100 to 400 parts by mass of a polystyrene-based resin with respect to 100 parts by mass of a carbon black-containing polyolefin-based resin.

The carbon black-containing polyolefin-based resin may be obtained by melting and kneading carbon black and a polyolefin-based resin by a publicly known method.

As the carbon black contained in the carbon black-containing polyolefin-based resin, there are no particular limitations so long as such is carbon black used in the relevant technical field; and, for example, furnace black, Ketchen black, channel black, thermal black, acetylene black, graphite, and carbon fiber can be mentioned; and more specifically, as examples of the carbon black there may be mentioned commercialized products, as used in Examples.

As the polyolefin-based resin contained in the carbon black-containing polyolefin-based resin, there are no particular limitations so long as such is a polyolefin-based resin used in the relevant technical field; and as examples of the polyolefin-based resin there may be mentioned resins obtained by a publicly known polymerization procedure; and these resins may include cross-linked resins. As examples of the polyolefin-based resin there may be mentioned polyethylene-based resins such as branched low-density polyethylene, linear chain low-density polyethylene, medium-density polyethylene, high-density polyethylene, ethylene-vinyl acetate copolymers, ethylene-methyl methacrylate copolymers, and cross-linked bodies of these polymers; and polypropylene-based resins such as propylene, ethylene-propylene random copolymers, propylene-1-butene copolymers, and ethylene-propylene-butene random copolymers. These low-density polyethylenes are preferably 0.90 to 0.94 g/cm³ in density, more preferably 0.91 to 0.94 g/cm³, and most preferably 0.91 to 0.93 g/cm³. More specifically, as examples of the polyolefin-based resin there may be mentioned commercialized products, as used in Examples.

(g) Polystyrene-based Resin (PS)

As the polystyrene-based resin contained in the carbon black-containing composite resin particles, there are no particular limitations so long as such is a resin containing a styrene-based monomer as a main component used in the relevant technical field; and styrene or a styrene derivative alone or as a copolymer can be mentioned.

As styrene derivatives, α-methylstyrene, vinyl toluene, chlorostyrene, ethylstyrene, isopropylstyrene, dimethylstyrene, bromostyrene, and the like can be mentioned. These styrene-based monomers may be used alone or may be combined.

The polystyrene-based resin may be a resin that is combined with a vinyl-based monomer copolymerizable with a styrene-based monomer.

As the vinyl-based monomer, for example, multifunctional monomers such as divinylbenzenes such as o-divinylbenzene, m-divinylbenzene, and p-divinylbenzene, and alkylene glycol di(meth)acrylates such as ethylene glycol di(meth)acrylate and polyethylene glycol di(meth)acrylate; (meth)acrylonitrile; methyl(meth)acrylate; butyl (meth) acrylate; and the like can be mentioned. Among these, multifunctional monomers are preferable, ethylene glycol di(meth)acrylate, polyethylene glycol di(meth)acrylates in which the number of ethylene units is 4 to 16, and divinylbenzenes are more preferable, and divinylbenzenes and ethylene glycol di(meth)acrylate are particularly preferable. The monomers may be used alone or may be combined.

Also, when monomers are combined, it is desirable that the content thereof is set so that the styrene-based monomer has an amount so as to become the main component (for example, 50% by mass or more).

In the present invention, "(meth)acryl" means "acryl" or "methacryl."

The composite resin pre-expanded particles of the present invention comprise, for example, 100 to 400 parts by mass of the polystyrene-based resin with respect to 100 parts by mass of the carbon black-containing polyolefin-based resin.

If the polystyrene-based resin is less than 100 parts by mass, capability of retaining a blowing agent in the composite resin pre-expanded particles may decrease; high expandability may not be possible; and stiffness of an expanded molded article may decrease. On the other hand, if the polystyrene-based resin exceeds 400 parts by mass, the polystyrene-based resin may not be sufficiently immersed in the carbon black-containing polyolefin-based resin particles inwardly and may be left in large quantity on a surface of the carbon black-containing composite resin particles; therefore, an undesired result may be found such as white particles. Additionally, other undesired results include a decrease in crack resistance of an expanded molded article as well as a decrease in chemical resistance of the expanded molded article.

The polystyrene-based resin (parts by mass) is, for example, 100, 120, 130, 140, 150, 160, 170, 180, 190, 200, 210, 220, 230, 240, 250, 260, 270, 280, 290, 300, 320, 340, 360, 380 or 400 with respect to 100 parts by mass of the carbon black-containing polyolefin-based resin.

The polystyrene-based resin is preferably 120 to 300 parts by mass with respect to 100 parts by mass of the carbon black-containing polyolefin-based resin.

(h) Particle Diameter of Carbon Black-containing Composite Resin Particles

It is desirable that the carbon black-containing composite resin particles (hereinafter also referred to as "composite resin particles") before being immersed in the blowing agent are 0.5 to 3.0 mm in average particle diameter.

If the average particle diameter of the composite resin particles is less than 0.5 mm, the composite resin particles may not have high expandability. On the other hand, if the average particle diameter of the composite resin particles exceeds 3.0 mm, fillingness of the pre-expanded particles may become insufficient at the time of molding and processing an article.

The average particle diameter (mm) is, for example, 0.5, 0.6, 0.7, 0.8, 0.9, 1.0, 1.1, 1.2, 1.3, 1.4, 1.5, 1.6, 1.7, 1.8, 1.9, 2.0, 2.2, 2.4, 2.6, 2.8 or 3.0.

The composite resin particles are more preferably 0.5 to 2.0 mm in average particle diameter.

(i) Particle Diameter of Carbon Black-containing Composite Resin Pre-expanded Particles It is desirable that the carbon black-containing composite resin pre-expanded particles (hereinafter also referred to as "composite resin pre-expanded particles") formed by expanding the composite resin particles are 0.8 to 12.0 mm in average particle diameter.

If the average particle diameter of the composite resin pre-expanded particles is less than 0.8 mm, expandability may decrease; and stretch of a surface of an expanded molded article may be worsen, at the time of expanding and molding an article. On the other hand, if the average particle diameter of the composite resin pre-expanded particles exceeds 12.0 mm, fillingness of the pre-expanded particles may become insufficient at the time of molding and processing an article.

The particle diameter (mm) is, for example, 0.8, 1.0, 1.5, 2.0, 2.5, 3.0, 3.5, 4.0, 4.5, 5.0, 5.5, 6.0, 7.0, 8.0, 9.0, 10.0, 11.0 or 12.0.

The composite resin particles are more preferably 0.8 to 6.0 mm in average particle diameter.

(2) Method for Producing Composite Resin Pre-expanded Particles

The composite resin pre-expanded particles of the present invention may be produced, for example, by a method comprising the successive steps of:

(A) obtaining a suspension by dispersing carbon black-containing polyolefin-based resin particles in an aqueous medium comprising a dispersant;

(B) adding a styrene-based monomer and a polymerization initiator to the obtained suspension, heating the mixture to a temperature that does not substantially allow polymerization of the styrene-based monomer, and immersing the styrene-based monomer in the carbon black-containing polyolefin-based resin particles to obtain a reaction solution;

(C) heating the obtained reaction solution to temperatures of (T−10)° C. to (T+20)° C., in which T° C. indicates a melting point of a polyolefin-based resin in the carbon black-containing polyolefin-based resin particles, so as to polymerize the styrene-based monomer, and repeating these processes three times or more to obtain carbon black-containing composite resin particles;

(D) immersing a blowing agent in the obtained carbon black-containing composite resin particles to obtain expandable carbon black-containing composite resin particles; and (E) heating and pre-expanding the obtained expandable carbon black-containing composite resin particles in an reaction vessel by introducing a gauge pressure 0.004 to 0.09 MPa of steam so as to obtain carbon black-containing composite resin pre-expanded particles.

As will be described in Steps (A) to (C) below, the composite resin particles are obtained by multistage polymerization, in which the immersion of the styrene-based monomer into the polyolefin-based resin particles and the polymerization of the styrene-based monomer are repeated three times or more.

The immersion of the styrene-based monomer into the polyolefin-based resin particles is carried out at a temperature that does not substantially allow the polymerization of the styrene-based monomer; and then the polymerization in Step (C) is carried out at temperatures of $(T-10)°$ C. to $(T+20)°$ C., so that the styrene-based monomer may polymerize in a state in which the styrene-based monomer is absorbed into the polyolefin-based resin particles. The multistage polymerization is carried out three times or more so that a styrene-based monomer content used in each polymerization may be kept low, with the result that the styrene-based monomer may polymerize well in the polyolefin-based resin. The number of the multistage polymerization is preferably 3 to 5 times. Carrying out the multistage polymerization 6 times or more takes a long time to finish a production process, with the result that production costs may go up significantly.

The styrene-based monomer content used in each polymerization may be properly divided in such a way that the carbon black-containing polyolefin-based resin and the polystyrene-based resin have a mass ratio as described above.

(a) Step (A)

The carbon black-containing polyolefin-based resin particles are dispersed in the aqueous medium comprising the dispersant to obtain the suspension.

(a-1) Carbon Black-Containing Polyolefin-Based Resin Particles

The carbon black-containing polyolefin-based resin particles will form nucleus resin particles (hereinafter also referred to as "seed particles") and may be obtained by melting and kneading the carbon black-containing polyolefin-based resin by an extruder, by extruding the carbon black-containing polyolefin-based resin in the form of a strand, and by cutting the strand so as to have a desired particle diameter.

A resin extruding hole of a dice is desirably 0.2 to 1.0 mm in diameter to obtain a predetermined size of the nucleus resin particles; and a resin pathway is desirably 2.0 to 6.0 mm in land length to maintain high dispersivity of the polystyrene-based resin, to retain a resin pathway inlet of the dice with 10 to 20 MPa of pressure, and to adjust a resin temperature of the resin extruded from the extruder to be 200 to 270° C. at a dice inlet.

The desired nucleus resin particles are obtained by adjusting the screw-structured extruder, the dice, extrusion conditions, and underwater cutting conditions.

The nucleus resin particles may comprise additives such as a compatibilizing agent for the polyolefin-based resin and the polystyrene-based resin, a cell regulator, and an antistatic agent, as long as the additives do not deteriorate any effects of the present invention.

A particle diameter of the nucleus resin particles may be properly adjusted according to the average particle diameter of the composite resin particles; and the particle diameter ranges preferably from 0.4 to 1.5 mm and more preferably 0.4 to 1.0 mm. An average mass of the nucleus resin particles is 30 to 90 mg per 100 particles. Examples of a shape of the nucleus resin particles include sphere-shaped, oval-shaped (egg-shaped), cylindrical, and prismatic.

(a-2) Polymerization Initiator

As the polymerization initiator used in the aforementioned production method, there are no particular limitations so long as such has been conventionally used in the polymerization of styrene-based monomers and, for example, organic peroxides such as benzoyl peroxide, lauryl peroxide, t-butyl peroxybenzoate, t-butyl peroxy-2-ethylhexanoate, t-butyl peroxide, t-butyl peroxypivalate, t-butyl peroxyisopropylcarbonate, t-butyl peroxyacetate, 2,2-bis(t-butylperoxy)butane, t-butylperoxy-3,3,5-trimethylhexanoate, di-t-butylperoxyhexahydroterephthalate, 2,2-di-t-butylperoxybutane, di-t-hexylperoxide, and dicumyl peroxide; azo compounds such as azobisisobutyronitrile and azobisdimethylvaleronitrile; and the like can be mentioned. These may be used alone or in combination, but preferably multiple polymerization initiators whose decomposition temperature for obtaining a half-life of 10 hours is from 60 to 130° C. are used in combination.

(a-3) Suspension Stabilizer

Furthermore, in the aforementioned production method, a suspension stabilizer may be used in order to stabilize dispersion of styrene-based monomer droplets and nucleus resin particles. As such suspension stabilizer, there are no particular limitations so long as such has been conventionally used in the suspension polymerization of styrene-based monomers and, for example, water-soluble polymers such as polyvinyl alcohol, methyl cellulose, polyacrylamide, and polyvinyl pyrrolidone; poorly-soluble inorganic compounds such as tribasic calcium phosphate, hydroxyapatite, and magnesium pyrophosphate; and the like can be mentioned.

Also, when a poorly-soluble inorganic compound is used, normally an anionic surfactant is combined.

As such anionic surfactant, for example, fatty acid soap; N-acylamino acids or salts thereof; carboxylates such as alkyl ether carboxylates; sulfonates such as alkyl benzene sulfonates, alkyl naphthalene sulfonates, dialkyl sulfosuccinic acid ester salts, alkyl sulfoacetates, and α-olefin sulfonates; sulfuric acid ester salts such as higher alcohol sulfuric acid ester salts, secondary higher alcohol sulfuric acid ester salts, alkyl ether sulfates, and polyoxyethylene alkyl phenyl ether sulfates; phosphoric acid ester salts such as alkyl ether phosphoric acid ester salts and alkyl phosphoric acid ester salts; and the like can be mentioned.

(a-4) Other Components

The composite resin particles may comprise additives such as a plasticizer, a binding inhibitor, a cell regulator, a crosslinking agent, a filler, a flame retardant, a flame-retardant auxiliary agent, a lubricant, a fusion accelerator, an antistatic agent, and a spreader, as long as the additives do not deteriorate any properties.

As the flame retardant, tri(2,3-dibromopropyl)isocyanate, bis[3,5-dibromo-4-(2,3-dibromopropoxy)phenyl]sulfone, tetrabromocyclooctane, hexabromocyclododecane, trisdibromopropylphosphate, tetrabromobisphenol A, tetrabromobisphenol A-bis(2,3-dibromo-2-methylpropyl ether), tetrabromobisphenol A-bis(2,3-dibromopropyl ether), 1,2,3,4-tetrabromobutane, tetrabromopentane, 2,2-bis(4-allyloxy-3,5-dibromophenyl)propane, 2,2-bis(4-hydroxyethoxy-3,5-dibromophenyl)propane, 2,2-bis(4-(2,3-dibromo)propyloxy-3,5-dibromophenyl)propane, pentabromodiphenylether, hexabromodiphenylether, octabromodiphenylether, decabromodiphenylether, tribromophenol, dibromoethylbenzene, 1,2,3,4,5,6-hexabromocyclohexane, 1,2,5,6,9,10-hexabromocyclododecane, octabromocyclohexadecan1-chloro-2,3,4,5,6-pentabromocyclohexane, tris-(2,3-dibromopropyl)-phosphate, ester or acetal of dibromopropanol, tribromophenol, tribromostyrene, tribromophenolallylether and the like can be mentioned.

As the flame-retardant auxiliary agent, organic peroxides such as 2,3-dimethyl-2,3-diphenyl butane, 3,4-dimethyl-3,4-diphenyl hexane, dicumyl peroxide, and cumene hydroperoxide can be mentioned.

It is particularly desirable that the composite resin particles of the present invention as well as the composite resin pre-expanded particles, in which the composite resin particles are pre-expanded by immersing the blowing agent, further comprise, as the flame retardant, 1.5 to 6.0 parts by mass of tri(2,3-dibromopropyl)isocyanate or bis[3,5-dibromo-4-(2,3-dibromopropoxy)phenyl]sulfone with respect to 100 parts by mass of the composite resin pre-expanded particles and, as the flame-retardant auxiliary agent, 0.1 to 2.0 parts by mass of 2,3-dimethyl-2,3-diphenyl butane with respect to 100 parts by mass of the composite resin pre-expanded particles.

Examples of how to add the flame retardant and the flame-retardant auxiliary agent include as follows: Adding the flame retardant and the flame-retardant auxiliary agent to a suspension of the composite resin particles while being stirred and mixed during heating; and melting and kneading the flame retardant and the flame-retardant auxiliary agent by an extruder, as will be described in Examples below.

If an additive amount of the flame retardant is less than 1.5 parts by mass, flame retardancy may become insufficient. On the other hand, if an additive amount of the flame retardant exceeds 6.0 parts by mass, thermal resistance of an expanded molded article may decrease.

The additive amount (parts by mass) of the flame retardant is, for example, 1.5, 2.0, 2.5, 3.0, 3.5, 4.0, 4.5, 5.0, 5.5 or 6.0.

The additive amount of the flame retardant is preferably 2.0 to 5.0 parts by mass with respect to 100 parts by mass of the composite resin pre-expanded particles.

If an additive amount of the flame-retardant auxiliary agent is less than 0.1 parts by mass, flame retardancy may become insufficient. On the other hand, if an additive amount of the flame-retardant auxiliary agent exceeds 2.0 parts by mass, thermal resistance of an expanded molded article may decrease.

The additive amount (parts by mass) of the flame-retardant auxiliary agent is, for example, 0.1, 0.5, 1.0, 1.5 or 2.0.

The additive amount of the flame-retardant auxiliary agent is preferably 1.0 to 2.0 parts by mass with respect to 100 parts by mass of the composite resin pre-expanded particles.

The composite resin particles may comprise the plasticizer whose boiling point exceeds 200° C. at 1 atm so as to maintain good expanding moldability even if a pressure of steam is low at the time of the heating and expanding.

As the plasticizer, phthalic acid esters; glycerin fatty acid esters such as glycerin diacetomonolaurate, glycerin tristearate, and glycerin diacetomonostearate; adipic acid esters such as diisobutyl adipate; coconut oil; and the like can be mentioned.

A plasticizer content in the composite resin particles is desirably 0.1 to 3.0% by mass.

As the binding inhibitor, calcium carbonate, silica, zinc stearate, aluminum hydroxide, ethylene bis-stearic acid amide, calcium phosphate tribasic, dimethyl silicone, and the like can be mentioned.

As the cell regulator, ethylene bisstearic acid amides, polyethylene wax, and the like can be mentioned.

As the crosslinking agent, organic peroxides such as 2,2-di-t-butyl peroxybutane, 2,2-bis(t-butylperoxy)butane, dicumyl peroxide, 2,5-dimethyl-2,5-di-t-butyl peroxyhexane, and the like can be mentioned.

As the filler, synthetic or naturally-produced silicon dioxide and the like can be mentioned.

As the lubricant, paraffin wax, zinc stearate, and the like can be mentioned.

As the fusion accelerator, stearic acid, stearic acid triglycerides, hydroxystearic acid triglycerides, stearic acid sorbitan esters, polyethylene wax, and the like can be mentioned.

As the antistatic agent, polyoxyethylene alkylphenol ethers, stearic acid monoglycerides, polyethylene glycol, and the like can be mentioned.

As the spreader, polybutene, polyethylene glycol, silicone oil, and the like can be mentioned.

(a-5) Stirring

It is desirable that stirring conditions are adjusted in such a way that a stirring required power (Pv) required to stir 1 $m^3$ of the aqueous medium is 0.06 to 0.8 $kw/m^3$ that comprises the nucleus resin particles and the styrene-based monomer and optionally comprises a disperse material and a dissolved material. The stirring required power is preferably 0.1 to 0.5 $kw/m^3$. This stirring required power corresponds to energy per net unit volume at the time of stirring the contents in a reaction container.

The stirring required power may be measured as follows.

More specifically, the aqueous medium comprising the nucleus resin particles and the styrene-based monomer and optionally comprising the disperse material and the dissolved material is supplied into a polymerization vessel installed in a polymerization apparatus and is stirred while a stirring blade rotates at the predetermined number of revolutions. In this case, a revolution drive load required to rotate the stirring blade is measured as a current value $A_1$ (ampere). This current value $A_1$ is multiplied by an effective voltage (volt) to obtain a value $P_1$ (watt).

The stirring blade of the polymerization apparatus is rotated in the empty polymerization vessel at the same number of revolutions as above, and a revolution drive load required to rotate the stirring blade is measured as a current value $A_2$ (ampere). This current value $A_2$ is multiplied by an effective voltage (volt) to obtain a value $P_2$ (watt) so as to calculate a stirring required power according to the following formula. It should be noted that V ($m^3$) indicates an entire volume of the aqueous medium comprising the nucleus resin particles and the styrene-based monomer and optionally comprising the disperse material and the dissolved material.

$$\text{stirring required power } (Pv=(P_1-P_2)/V$$

As a shape and a structure of the polymerization vessel, there are no particular limitations so long as such has been conventionally used for the polymerization of styrene-based monomers.

As the stirring blade, there are no particular limitations as long as the stirring required power is configurable within a predetermined range.

More specifically, examples of the stirring blade include paddle blades such as a V-type paddle blade, a pitched paddle blade, a flat paddle blade, a Pfaudler blade, a pull margin blade; turbine blades such as a turbine blade and a fan turbine blade; and propeller blades such as a Marin propeller blade. Of these stirring blades, the paddle blades are preferable; and more preferably the V-type paddle blade, the pitched paddle blade, the flat paddle blade, the Pfaudler blade and the pull margin blade. The stirring blade may be either a single-stage blade or a multistage blade.

As regards a size of the stirring blade, there are no particular limitations as long as the stirring required power is configurable within a predetermined range.

Moreover, the polymerization vessel may be provided with a baffle plate (baffle).

(b) Step (B)

The styrene-based monomer and the polymerization initiator are then added to the obtained suspension, the mixture is heated to a temperature that does not substantially allow the polymerization of the styrene-based monomer, and then the styrene-based monomer is immersed in the carbon black-containing polyolefin-based resin particles to obtain the reaction solution.

With regard to the polymerization initiator, see the section titled "(a-2) Polymerization initiator" under the section (a) above.

The temperature that does not substantially allow the polymerization of the styrene-based monomer may be properly adjusted according to types of the raw resins and their formulation ratio, and properties of composite resin pre-expanded particles to be produced; however, this temperature is normally from 45 to 80° C.

A suitable time to immerse the styrene-based monomer in the carbon black-containing polyolefin-based resin particles is 30 min. to 2 hours. If the polymerization progresses before the styrene-based monomer is sufficiently immersed in the carbon black-containing polyolefin-based resin particles, polystyrene polymer powder may be formed.

(c) Step (C)

The obtained reaction solution is then heated to temperatures of (T−10)° C. to (T+20)° C., in which T° C. indicates a melting point of the polyolefin-based resin in the carbon black-containing polyolefin-based resin particles, so as to polymerize the styrene-based monomer.

If the polymerization temperatures are lower than (T−10)° C., the obtained resin particles may contain less polystyrene-based resin in a central part of the resin particles, with the result that resin particles and an expanded molded article having good blackness and mechanical properties may not be obtained. On the other hand, if the polymerization temperatures exceed (T+20)° C., the styrene-based monomer may start polymerizing before being sufficiently immersed in the carbon black-containing polyolefin-based resin particles, with the result that resin particles and an expanded molded article having good blackness and mechanical properties may not be obtained.

In the case where a melting point of the polyolefin-based resin is, for example, 140° C., the polymerization temperatures are from 130 to 160° C.

Other polymerization conditions may be properly adjusted according to composition of composite resin particles to be produced.

A polymerization time per multistage polymerization is normally in the order of 1 to 6 hours, and preferably 1.5 to 3 hours in consideration of quality and productivity of composite resin particles to be produced.

A pressure in the container at the time of the polymerization is normally in the order of 0.05 to 0.5 MPa, and preferably 0.1 to 0.3 MPa in consideration of safeness of the polymerization in terms of stability operations.

The polymerization may be carried out after the monomer is absorbed into the nucleus resin particles or while the monomer is absorbed into the nucleus resin particles. It should be noted that a content of the monomer is almost the same as a content of the polystyrene-based resin obtained after the polymerization.

Additionally, a heating-up period or a cooling-down period to reach a preset temperature in each Step changes depending on an ambient temperature; however, a suitable rate to reach the preset temperature is 0.3° C./min. to 3.0° C./min. on the basis of the entire period from the initiation temperature to the purposive temperature.

Especially, if a rate of temperature increase is too fast, the styrene-based monomer may start polymerizing before the styrene-based monomer is sufficiently immersed in the carbon black-containing polyolefin-based resin particles; and resin particles and an expanded molded article having good blackness and mechanical properties may not be obtained. On the other hand, if a rate of temperature increase is too slow, the process may become too long, leading to high production costs. The rate is desirably 0.4° C./min. to 2.5° C./min.

It is desirable that the final process in Step (C) is retained longer than the previous processes in Step (C) at temperatures of (T−10)° C. to (T+20)° C.; namely, annealing the reaction solution is desirable.

The following will describe how important the annealing is.

During the processes before the annealing process, the styrene-based monomer and the polymerization initiator absorbed in the nucleus resin particles do not yet completely react; and the unreacted components are still present in the composite resin particles to no small extent. These unreacted components in the unannealed composite resin particles give the following problems to an expanded molded article because of the low-molecular-weight unreacted component such as the styrene-based monomer: a decrease in mechanical properties and in thermal resistance of the expanded molded article, and odor caused by the volatile unreacted components. The annealing process, however, may secure a time to induce the polymerization reaction of the unreacted components and eliminate the remaining unreacted components without affecting properties of the expanded molded article.

(d) Step (D)

The blowing agent is then immersed in the obtained composite resin particles by a publicly known method to obtain the expandable composite resin particles.

Low temperatures may require a time to immerse the blowing agent in the composite resin particles and may deteriorate production efficiency of the expandable composite resin particles, while high temperatures may cause cohesion of the expandable composite resin particles significantly; therefore, temperatures are preferably from 50 to 130° C. and more preferably 60 to 100° C.

(d-1) Blowing Agent

As the blowing agent, a volatile blowing agent is desirable; and there are no particular limitations so long as such has been conventionally used in the expansion of polystyrene-based resins. As examples of the volatile blowing agent there may be mentioned aliphatic hydrocarbons having 5 or less carbons such as isobutane, n-butane, isopentane, n-pentane, and neopentane; and inorganic gases such as nitrogen and carbon dioxide. In particular, butane-based blowing agents and pentane-based blowing agents are preferable. It can be expected that pentane will act as a plasticizer.

A content of the volatile blowing agent in the expandable composite resin particles is normally in the range of from 2 to 10% by mass; however, preferably in the range of from 3 to 10% by mass and particularly preferably in the range of from 3 to 8% by mass.

If a content of the volatile blowing agent is low—for example, less than 2% by mass, a low-density expanded molded article may not be obtainable from the expandable composite resin particles; and since an effect of increasing a secondary expansion force cannot be achieved at the time of the expansion molding in the cavity, an appearance of an expanded molded article may deteriorate. On the other hand, if a content of the volatile blowing agent is high—for example, exceeding 10% by mass, the time required for the cooling step in the production process of an expanded molded article using the expandable composite resin particles may increase, leading to low productivity in some situations.

(d-2) Blowing Auxiliary Agent

The expandable composite resin particles may comprise a blowing auxiliary agent together with the blowing agent.

As the blowing auxiliary agent, there are no particular limitations so long as such has been conventionally used in the expansion of polystyrene-based resins. For example, aromatic organic compounds such as styrene, toluene, ethylbenzene, and xylene; cyclic aliphatic hydrocarbons such as cyclohexane and methylcyclohexane; and solvents having a boiling point of 200° C. or lower at 1 atm such as ethyl acetate and butyl acetate can be mentioned.

A content of the blowing auxiliary agent in the expandable composite resin particles is normally in the range of from 0.3 to 2.5% by mass and preferably 0.5 to 2% by mass.

If a content of the blowing auxiliary agent is low—for example, less than 0.3% by mass, a plasticization effect of the polystyrene-based resin may not be exhibited. On the other hand, if a content of the blowing auxiliary agent is high—for example, exceeding 2.5% by mass, an appearance of an expanded molded article to be obtained by expanding the expandable composite resin particles may deteriorate because of shrinkage and melting occurring to the expanded molded article, or a time required for the cooling step in the production process of the expanded molded article using the expandable composite resin particles may increase.

(e) Step (E)

The obtained expandable composite resin particles are then heated and pre-expanded in an reaction vessel by introducing a gauge pressure 0.004 to 0.09 MPa of steam (steam) so as to obtain composite resin pre-expanded particles (hereinafter also referred to as "pre-expanded particles") having a predetermined bulk density.

As examples of this procedure there may be mentioned batch-type expansion and continuous expansion that introduce steam, and emission expansion carried out under pressure; and air may be introduced as needed together with the steam during, the expansion.

The properties of the obtained pre-expanded particles are as described above.

(3) Expanded Molded Article

An expanded molded article of the present invention is obtained by expanding and molding the pre-expanded particles in a cavity.

More specifically, the expanded molded article is obtained by a publicly known method such that a mold (cavity) of a foam molding machine is fed with the pre-expanded particles; and the pre-expanded particles are heated again so that the particles are expanded and thermally fused.

(a) Density

It is desirable that the expanded molded article of the present invention has a density ranging from 0.015 to 0.25 g/cm$^3$.

If the density of the expanded molded article is lower than 0.015 g/m$^3$, impact resistance may become insufficient.

On the other hand, if the density of the expanded molded article exceeds 0.25 g/m$^3$, the expanded molded article would have a limited effect of being lightweight.

The density (g/cm$^3$) is, for example, 0.015, 0.020, 0.025, 0.026, 0.027, 0.028, 0.029, 0.030, 0.031, 0.032, 0.033, 0.035, 0.04, 0.05, 0.10, 0.15, 0.20 or 0.25.

The expanded molded article is preferably 0.025 to 0.033 g/cm$^3$ in bulk density.

(b) Blackness

It is desirable that the expanded molded article of the present invention meets the following conditions:

a relation formula represented by $$\Delta E' = L^* + |a^*| + |b^*| < 30$$

wherein $\Delta E'$ indicates blackness, $L^*$ indicates intensity, and $a^*$ and $b^*$ indicate color coordinates, in accordance with a color-difference measurement based on JIS Z8729-2004 "color specification-CIELAB and CIELUV color spaces"; and a relation of $\sigma < 1.0$ wherein $\sigma$ indicates a standard deviation of the blackness $\Delta E'$.

How to measure the blackness will be detailed in Examples.

The blackness $\Delta E'$ lower than 30 is regarded as good, and the blackness $\Delta E'$ exceeding 30 is regarded as bad.

The standard deviation $\sigma$ less than 1.0 ($\sigma < 1.0$) concerning the blackness $\Delta E'$ is regarded as good, and the standard deviation $\sigma$ exceeding 1.0 ($\sigma \geq 1.0$) is regarded as bad.

(c) Fused-layer Thickness

A surface of the expanded molded article of the present invention is sliced into about a 1-mm-thick slice, and the obtained slice is immersed in toluene for 24 hours at 25° C. to extract a polystyrene-based resin component as described above; and it is desirable that the cross-section surface of the slice photographed by a microscope is observed to have a layer thickness of 100 to 200 μm at an interface between the fused outermost layers of the carbon black-containing composite resin pre-expanded particles.

Namely, it is desirable that the expanded molded article of the present invention has the layer thickness of 100 to 200 μm at the interface between the fused outermost layers of the carbon black-containing composite resin pre-expanded particles after undergoing the following tests:

(a') the surface of the expanded molded article is sliced into a 1-mm slice;

(b') the obtained slice is immersed in toluene at 25° C. for 24 hours to extract a polystyrene-based resin component as described above;

(c') the cross-section surface of the slice is then subjected to magnified photographing by a microscope;

(d') the obtained microscope image is observed.

How to measure the fused-layer thickness will be detailed in Examples.

The fused-layer thickness less than 100 μm may not meet sufficient blackness. On the other hand, if the fused-layer thickness of the expanded molded article exceeds 200 μm, stretch of a surface of the expanded molded article may be substantially worsened; and an appearance of the expanded molded article may deteriorate.

The fused-layer thickness (μm) is, for example, 100, 105, 110, 115, 120, 125, 130, 135, 140, 145, 150, 155, 160, 165, 170, 180, 190 or 200.

The industrial field where the present invention is used requires an expanded molded article being lightweight and having excellent blackness; therefore, the fused-layer thickness is preferably 105 to 165 μm in consideration of the bulk density and the blackness.

The fused-layer thickness varies mainly in accordance with a thickness of the outermost layer of the composite resin pre-expanded particles. Accordingly, the fused-layer thickness may be adjusted to the above-mentioned 100 to 200 μm by adjusting a thickness of the outermost layer of the composite resin pre-expanded particles to 30 to 80 μm.

EXAMPLES

In the following, the present invention will be explained in detail through the use of Examples and Comparative Examples; however, the following Examples are merely the exemplifications of the present invention; and the present invention should not be limited only to these Examples.

In the Examples and the Comparative Examples, the obtained pre-expanded particles and expanded molded article were evaluated as follows.

Bulk Density (g/cm$^3$) of Pre-expanded Particles

A bulk density of the pre-expanded particles is measured as follows.

A mass (a) of about 5 g of the pre-expanded particles is weighed to two decimal places, and the pre-expanded particles are placed in a 500-cm$^3$ measuring cylinder with a minimum scale unit of 5 cm$^3$. A volume (b) of the pre-expanded particles is then read off as a pressing member is pressed against an opening of the measuring cylinder —the pressing member is a circular resin plate having a slightly smaller diameter than that of the measuring cylinder and has a resin rod, which is about 1.5 cm in width and about 30 cm in length, perpendicularly fixed to the pressing member at its center.

A bulk density (g/cm$^3$) is obtained from a mass (a) and a volume (b) of the obtained pre-expanded particles by the following formula:

$$(g/cm^3)=(a)/(b)$$

Outermost Layer Thickness (μm) of Pre-expanded Particles

One of the pre-expanded particles is sliced with a razor's edge into about a 1-mm-thick slice in such a way that cross-section surfaces of cells are exposed on both surfaces of the slice; the obtained slice is immersed in toluene for 24 hours at 25° C. to extract a polystyrene-based resin component; the cross-section surface of the slice is photographed by a microscope; and a thickness (μm) of the outermost layer is measured from the photographed image.

Absorbance Ratio of Surfaces of Composite Resin Pre-expanded Particles (in a case of a Polypropylene-based Resin)

An absorbance ratio (D698/D1376) is measured as below.

Absorbance values obtained from infrared absorption spectra indicate peak heights of vibrations of the resin components contained in the composite resin particles.

10 particles, which are randomly selected, are subjected to a surface analysis by an ATR measuring technique of an infrared spectroscopic analysis so as to obtain infrared absorption spectra. This analysis gives the infrared absorption spectra ranging from the particle surface to a depth of a few micrometers (about 2 μm).

An absorbance ratio (D698/D1376) is calculated from each of the infrared absorption spectra, and an arithmetic average of the calculated absorbance ratios indicates an absorbance ratio.

A polystyrene-based resin ratio (% by mass) is calculated from the absorbance ratio (D698/D1376) on the basis of an analytical curve to be described below.

The absorbance values, D698 and D1376, are measured by using a measurement device (manufactured by Nicolet Inc.; trade name "Magna 560" which is a Fourier transform infrared spectrometer) and an ATR accessory ("Thunder dome" manufactured by Spectra-Tech, Inc.) under the following conditions.

(Measurement Conditions)

High refractive index crystal type: Ge (Germanium)
Incidence angle: 45°±1°
Measurement field: 4,000 cm$^{-1}$-675 cm$^{-1}$
Fraction dependency of measurement depth: not amended
Number of reflections: 1
Detector: DTGS KBr
Degradation ability: 4 cm$^{-1}$
Cumulated number: 32

Annotation: Infrared absorption spectra are measured under the above-described conditions without making contact with a specimen, and the measured infrared absorption spectra are referred to as background absorbance. During the measurement of specimens, measurement data are handled so as to prevent the background absorbance from being involved with the measured spectra. Using the ATR technique, intensity of the infrared absorption spectra changes depending on a contact state between the specimen and the high refractive index crystal. The spectra are thus measured under the following condition: A maximum load is imposed on the spectra with use of the ATR accessory "Thunder dome" while the contact state is roughly even.

The infrared absorption spectra obtained under the above-described conditions are subjected to peak processing as below to obtain their respective absorbance values.

The absorbance value D698 obtained from the 698-cm$^{-1}$ infrared absorption spectrum corresponds to an absorption spectrum of an out-of-plane deformation vibration of a benzene ring contained in a polystyrene-based resin. During the measurement of this absorbance value, peak separation is not carried out even if some other absorption spectra are overlapped at 698 cm$^{-1}$. The absorbance value D698 is based on a straight line as a baseline between 1,280 cm$^{-1}$ and 860 cm$^{-1}$ and means a maximum absorbance value between 710 cm$^{-1}$ and 685 cm$^{-1}$.

The absorbance value D1376 obtained from the 1,376-cm$^{-1}$ infrared absorption spectrum corresponds to an absorption spectrum of a symmetrical deformation vibration of $CH_3$ in a hydrocarbon —C—$CH_3$ contained in a polypropylene-based resin. During the measurement of this absorbance value, peak separation is not carried out even if some other absorption spectra are overlapped at 1,376 cm$^{-1}$. The absorbance value D1376 is based on a straight line as a baseline between 1,414 cm$^{-1}$ and 1,340 cm$^{-1}$ and means a maximum absorbance value between 1,400 cm$^{-1}$ and 1,350 cm$^{-1}$.

Formulation Ratio of a Polystyrene-based Resin in All Pre-expanded Particles

The pre-expanded particles are subjected to heat reduction at a heating temperature between 200° C. and 250° C. and then cooled; and the cooled particles are pulverized and weighed to obtain 2 g of the pulverized substance.

The pulverized substance is heated and kneaded by a small injection molding machine under the following conditions to mold cylindrical measurement specimens having a diameter of 25 mm and a height of 2 mm.

Used as the small injection molding machine is, for example, an injection molding machine (manufactured by CSI; trade name "CS-183").

Injection molding conditions: heating temperature between 200° C. and 250° C., and kneading time for 10 min.

Surfaces of the measurement specimens are subjected to an ATR infrared spectroscopic analysis so as to obtain their infrared absorption spectra.

An absorbance ratio (D698/D1376) is calculated from each of the infrared absorption spectra.

The absorbance ratio (D698/D1376) is measured as described above.

A polystyrene-based resin ratio (% by mass) is calculated from the absorbance ratio (D698/D1376) on the basis of an analytical curve to be described below.

Note that the ATR (Attenuated Total Reflectance) infrared spectroscopic analysis used in the present invention is an analytical method for measuring infrared absorption spectra by a single-reflection ATR technique using attenuated total reflectance. This analytical method allows an ATR prism having a high refractive index to adhere tightly to the specimens so that the specimens are irradiated with infrared light through the ATR prism, and reflected light from the ATR prism is spectrographically analyzed.

The ATR infrared spectroscopic analysis is widely used for a surface analysis of various substances including organic substances such as a high-polymer material for the following reasons: The spectra may be measured only by allowing the specimens to adhere to the ATR prism; and the surface analysis is capable of measuring a depth up to a few micrometers.

The absorbance value D698 obtained from the 698-$cm^{-1}$ infrared absorption spectrum corresponds to a peak height that comes in the vicinity of 698 $cm^{-1}$ of an out-of-plane deformation vibration of a benzene ring mainly contained in a polystyrene-based resin.

The absorbance value D1376 obtained from the 1,376-$cm^{-1}$ infrared absorption spectrum corresponds to a peak height that comes in the vicinity of 1,376 $cm^{-1}$ of a symmetrical deformation vibration of $CH_3$ in a hydrocarbon —C—$CH_3$ contained in a polypropylene-based resin.

<<Analytical Curve>>

How to obtain a compositional proportion of the polystyrene-based resin to the polypropylene-based resin according to the absorbance ratio is that several kinds of standard specimens are produced by uniformly mixing the polystyrene-based resin and the polypropylene-based resin in a predetermined compositional proportion; and each standard specimen is subjected to a particle surface analysis through the use of an ATR infrared spectroscopic analysis so as to obtain infrared absorption spectra. An absorbance ratio is calculated from each of the obtained infrared absorption spectra. An analytical curve is obtained based on the compositional proportion (the polystyrene-based resin ratio (% by mass) in the standard specimens) as a vertical axis and the absorbance ratio (D698/D1376) as a horizontal axis. Based on this analytical curve, "the surface polystyrene-based resin (PS) content (%) in the pre-expanded particles" and "the formulation ratio of the polystyrene-based resin in all the pre-expanded particles" of the present invention may be obtained from the absorbance ratio of the pre-expanded particles of the present invention.

The analytical curve is similar to the following formulas.

In a case of $D698/D1376<2.35, Y=-2.5119X_1^2+22.966X_1$; and in a case of $10.0>(D698/D1376)>2.35, Y=27.591 L_n(X_1)+16.225$, wherein $X_1=(D698/D1376)$ and $Y=$ polystyrene-based resin content (%).

Absorbance Ratio of Surfaces of Composite Resin Pre-expanded Particles (in a Case of a Polyethylene-based Resin)

An absorbance ratio (D698/D2850) of surfaces of the composite resin particles is obtained in the same manner as in the case of the polypropylene-based resin.

The obtained infrared absorption spectra are subjected to peak processing as below to obtain their respective absorbance values.

The absorbance value D698 obtained from the 698-$cm^{-1}$ infrared absorption spectrum corresponds to an absorption spectrum of an out-of-plane deformation vibration of a benzene ring contained in a styrene-based resin. During the measurement of this absorbance value, peak separation is not carried out even if some other absorption spectra are overlapped at 698 $cm^{-1}$. The absorbance value D698 is based on a straight line as a baseline between 2,000 $cm^{-1}$ and 870 $cm^{-1}$ and means a maximum absorbance value between 710 $cm^{-1}$ and 685 $cm^{-1}$.

The absorbance value D2850 obtained from the 2,850-$cm^{-1}$ infrared absorption spectrum corresponds to an absorption spectrum of a symmetrical stretching vibration of $CH_2$ in a hydrocarbon —C—$CH_2$ contained in a polyethylene-based resin. During the measurement of this absorbance value, peak separation is not carried out even if some other absorption spectra are overlapped at 2,850 $cm^{-1}$. The absorbance value D2850 is based on a straight line as a baseline between 3,125 $cm^{-1}$ and 2,720 $cm^{-1}$ and means a maximum absorbance value between 2,875 $cm^{-1}$ and 2,800 $cm^{-1}$.

How to obtain a compositional proportion of the polystyrene-based resin to the polyethylene-based resin according to the absorbance ratio is that several kinds of standard specimens are produced by uniformly mixing the polystyrene-based resin and the polyethylene-based resin in a predetermined compositional proportion; and each standard specimen is subjected to a particle surface analysis through the use of an ATR infrared spectroscopic analysis so as to obtain infrared absorption spectra. An absorbance ratio is calculated from each of the obtained infrared absorption spectra. An analytical curve is obtained based on the compositional proportion (the polystyrene-based resin ratio (% by mass) in the standard specimens) as a vertical axis and the absorbance ratio (D698/D2850) as a horizontal axis. Based on this analytical curve, a compositional proportion of the polystyrene-based resin to the polyethylene-based resin in the composite resin particles of the present invention is obtained from the absorbance ratio of the composite resin particles of the present invention.

The analytical curve is similar to the following formulas.

In a case of $D 698/D2850<1.42, Y=21.112X_2$; and in a case of $1.42<(D698/D2850)<8.24, Y=28.415L_n(X_2)+20.072$, wherein $X2=(D698/D2850)$ and $Y=$polystyrene-based resin content (%).

Average Cell Diameter (μm) of Pre-expanded Particles

Used as a measurement device is an electron scanning microscope, JSM-6360LV, manufactured by NEC Corporation.

10 particles, which are randomly selected from the pre-expanded particles, are divided into two halves through the center in a straight line with use of a razor's edge; and a surface part of a cross-section surface of the halved particles is photographed by the electron scanning microscope to obtain images magnified 20 times (100 times in some cases).

The photographed images are printed one by one on an A4-size sheet. Using the printed images, a length of a curve line (lineal length) passing through cells coming in contact with an outermost layer is measured; and the number of the cells coming in contact with the outermost layer is counted.

An average chord length (t) of the cells is calculated by the following formula through the use of the measuring results.

Average chord length $t$=lineal length/(number of cells×magnification of a photograph)

In a case where it is difficult to count the number of the cells through the use of the photographs magnified 20 times, the pre-expanded particles are divided into two halves in the same manner as above; and the halved particle is divided into 4 equal parts (8 equal parts in some cases) in a straight line passing through the center of a cross-section surface so as to photograph images magnified 100 times, measuring a length of a curve line (lineal length) passing through cells coming in contact with an outermost layer and counting the number of the cells coming in contact with the outermost layer, in the same manner as above and then calculating an average value from the images of the four parts (the eight parts in some cases). An average chord length (t) of the cells is calculated in the same manner as above.

Using the average chord length (t), a cell diameter (D) of the cells coming in contact with the outermost layer of the cross-section surface of the pre-expanded particles is calculated by the following formula.

$D=t/0.616$

An arithmetic average of the cell diameters obtained as above is to indicate an average cell diameter of the cells coming in contact with the outermost layer of the cross-section surface of the pre-expanded particles.

Thickness (μm) of an Interface between Fused Pre-expanded Particles of an Expanded Molded Article The expanded molded article obtained by the expansion molding is sliced with a ham slicer (manufactured by Fujishima Koki Co., Ltd.) into about a 1-mm-thick slice in such a way that cross-section surfaces of cells are exposed on both surfaces of the slice; the obtained slice is immersed in toluene for 24 hours at 25° C. to extract a polystyrene-based resin component; the cross-section surface of the slice is photographed by a microscope; and a thickness (μm) of an interface between the fused outermost layers of the carbon black-containing composite resin pre-expanded particles is measured from the photographed image.

Blackness ΔE'

Blackness ΔE' of the expanded molded article is evaluated with a color-difference measurement based on JIS Z8729-2004 "color specification—CIELAB and CIELUV color spaces."

Used for the measurement are a color-difference meter (manufactured by Konica Minolta, Inc.; model No. CR-400) and a standard white calibration board (Y:94.3;x:0.3144;y:0.3208) for calibration purposes.

More specifically, the blackness ΔE' is calculated by the following formula on the basis of intensity L* and color coordinates a* and b* that are calculated from an average value measured from a measurement area as Φ8 mm based on optional ten points on a matrix-like plane area of the expanded molded article.

$\Delta E'=L^*+|a^*|+|b^*|$

The evaluation of the blackness is evaluated by the following scale on the basis of the obtained. ΔE'.

ΔE'<30: good (O)

ΔE'≥30: bad (X)

To evaluate uneven color of the expanded molded article, a standard deviation o of the blackness ΔE' is calculated based on the optional ten measurement points.

σ<1.0: good (O)

σ≥1.0: bad (X)

Flame Retardancy

Flame retardancy of the expanded molded article is evaluated with measurements of a burning rate based on Federal Motor Vehicle Safety Standards of US (FMVSS 302).

A test piece of 350 mm×100 mm×12 mm (thickness) cut from the expanded molded article is measured for the burning rate, and the flame retardancy is indicated by the following scale.

80 mm/min. or lower of burning rate: good (O)
Over 80 mm/min. of burning rate: bad (X)

Carbon Black Content (%)

A carbon black content is measured by using a simultaneous thermogravimetric analyzer—TG/DTA6200 (manufactured by SII Nano Technology, Inc.).

A sampling method and temperature conditions are set as follows.

As a specimen, a platinum measurement container is fed with about 15 mg of a specimen at its bottom without having any space; and the specimen is measured based on alumina as a reference material.

As the temperature conditions, a temperature is increased from 30° C. to 520° C. at a speed of 10° C./min. at a nitrogen gas flow rate of 230 mL/min. and then is increased from 520° C. to 800° C. at a speed of 10° C./min. at an air flow rate of 160 mL/min.

A carbon black content is calculated as follows by using a dedicated data analysis software called "Muse." Using the obtained TG curve line (vertical axis: TG (%); and horizontal axis: temperature (° C.)), a reduced amount of the specimen weight at the time of the temperature increase from 520° C. to 800° C. is calculated to obtain a carbon black content (%).

Flame Retardant Content

Using a fluorescence X-ray measurement device called RIX-2100 (manufactured by Rigaku Corporation), Br-K$\beta_1$ is subjected to a strength measurement under the following conditions; and an element content of Br is obtained by an order analytical method.

Under a specimen preparative method, 2 to 3 g of the specimen is pressed by a heat press molder at temperatures of 200 to 230° C. to produce tablets having a thickness of 1 mm and a diameter of 30 mm; and the tablets are stored in a dedicated case for specimens (for measuring the tablets having the diameter of 30 mm) after being weighed.

A molecular weight corresponding value of the flame retardant is calculated by the following formula on the basis of the Br content obtained from the above-described method. For example, in a case of tris-(2,3-dibromopropyl) isocyanurate as the flame retardant, molecular weight corresponding value=Br content× 728.7/479.4

(Device Conditions)
Device: RIX-2100 (manufactured by Rigaku Corporation)
  X-ray tube target: Rh
  Analytical method: order analysis by FP thin-film method
  Measured diameter: 30 mm
  Spinning: yes
  Atmosphere: vacuumed
  Specimen type: metal
  Balance component: $C_8H_8$
  Adjustment of specimen protective film: none
  Smoothing: 11 points
  Flux component, dilution rate, impurity elimination: none
(Qualitative Element Conditions)
  Br-$K\beta_1$
  Tube: Rh (50 kV-60 mA)
  Primary filter: OUT
  Attenuator: 1/1
  Slit: std.
  Dispersive crystal: LIF1
  2θ:26.775 degrees (measurement range: 24 to 29 degrees)
  Detector: SC
  PHA L. L.: 100 U.L.:300
  Step: 0.02 degrees
  Time: 0.4 sec.
Melting Point (° C.)

A melting point is measured by using "Testing Methods for Transition Temperatures of Plastics" of JIS K7121-1987. A sampling method and temperature conditions are set as follows.

An aluminum measurement container is fed with about 6 mg of a specimen at its bottom without having any space, and the specimen is measured by using a differential scanning calorimeter—DSC6220 (manufactured by SII Nano Technology, Inc.)—under the following temperature conditions: A temperature is decreased from 30° C. to −40° C. at a nitrogen gas flow rate of 20 mL/min.; the temperature is retained for 10 min. and then is increased from −40° C. to 220° C. (1st heating); the temperature is retained for 10 min. and then is decreased from 220° C. to −40° C. (cooling); and the temperature is retained for 10 min. and then is increased from −40° C. to 220° C. (2nd heating) to obtain a DSC curve line. All the heating processes and the cooling processes are carried out at a speed of 10° C./min., and alumina is used as a reference material. In the present invention, the highest temperature of a melting peak during the 2nd heating is indicated as a melting point.

Example 1

(Production of Nucleus Resin Particles (Seed Particles))

1,900 g of a polypropylene-based resin (manufactured by Prime Polymer Co., Ltd.; trade name "Prime Polypro (Film)"; brand name "F-744NP"; a melting point of 140° C.) and 100 g of a furnace black as a black colorant (manufactured by Mitsubishi Chemical Corporation; trade name "Mitsubishi carbon black"; brand name "Intermediate color (MCF) #900") were poured into a tumbler mixer and mixed for 7 min.

The obtained mixture was then supplied into an extruder (manufactured by Toshiba Machine Co., Ltd.; model No.: SE-65) and was heated and melted to be extruded in the form of granulated pellets by an underwater cutting method, obtaining spherical carbon black-containing polypropylene-based resin particles in which the polypropylene-based resin comprises 5% by mass of the furnace black. These resin particles were adjusted to be 80 mg per 100 particles and to be about 1 mm in average particle diameter.

In the following Examples and Comparative Examples, a heating rate and a cooling rate were carried out at 1° C./min. during polymerization processes, flame-retardant processes, and production of expandable composite resin particles.
(Production of Carbon Black-containing Composite Resin Particles)
(Production of a Suspension)

760 g of the obtained carbon black-containing polypropylene-based resin particles were then placed in a 5-liter autoclave equipped with a stirrer (manufactured by Nitto Kouatsu); and 2,000 g of pure water as an aqueous medium, 20 g of magnesium pyrophosphate as a dispersant, and 0.5 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.
(1st Polymerization)

319 g of a styrene monomer, in which 0.6 g of dicumyl peroxide was already dissolved as a polymerization initiator, was then added dropwise to the obtained suspension over 30 min. This reaction solution was then heated to 140° C. and was retained at the same temperature for 2 hours to polymerize the styrene monomer in the carbon black-containing polypropylene-based resin particles.
(2nd Polymerization)

The reaction solution was then cooled to 70° C., and 2.7 g of sodium dodecyl benzenesulfonate as a surfactant was added to the reaction solution. 307 g of a styrene monomer, in which 0.6 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.
(3rd Polymerization)

The reaction solution was then cooled to 70° C.; and 307 g of a styrene monomer, in which 0.6 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.
(4th Polymerization)

The reaction solution was then cooled to 70° C.; and 307 g of a styrene monomer, in which 0.6 g of dicumyl peroxide was already dissolved as a polymerization initiator, was added dropwise to the reaction solution over 30 min. The reaction solution was then heated to 140° C. and was retained at the same temperature for 3.5 hours to polymerize the styrene monomer in the carbon black-containing polypropylene-based resin particles, obtaining carbon black-containing composite resin particles.
(Flame-retardant Process)

The reaction solution was then cooled to 60° C.; and 60 g of tri(2,3-dibromopropyl)isocyanate(manufactured. by Nippon Kasei Chemical Co., Ltd.) as a flame retardant and 30 g of 2,3-dimethyl-2,3-diphenyl butane (manufactured by Kayaku Akzo Corporation) as a flame-retardant auxiliary agent were added to the reaction solution. The reaction solution was then heated to 140° C. and was retained at the same temperature for 4 hours while being stirred so that the carbon black-containing composite resin particles were subjected to a flame-retardant treatment.

The reaction solution was then cooled to 25° C. and then was subjected to acid washing by using a 20% hydrochloric acid aqueous solution to eliminate the dispersant, so that 2,000 g of the carbon black-containing composite resin particles were taken out from the autoclave.
(Production of Expandable Composite Resin Particles)

2,000 g of the carbon black-containing composite resin particles and 2,000 g of water were then poured again into the 5-liter autoclave equipped with a stirrer, and 300 g of butane as a blowing agent (normal butane: isobutane=7:3) was also added thereto. The mixture was then heated to 70° C. and was retained at the same temperature for 4 hours while being stirred.

The mixture was then cooled to 25° C., and the carbon black-containing composite resin particles were taken out from the autoclave and were dehydrated and dried to obtain 2,100 g of expandable carbon black-containing composite resin particles.
(Production of Composite Resin Pre-expanded Particles)

1,000 g of the obtained expandable carbon black-containing composite resin particles were then poured into a 40-liter pre-expansion machine (manufactured by Kasahara Industry Co., Ltd.; model No.: PSX40), and a gauge pressure 0.04 MPa of steam was introduced into the machine so as to heat and pre-expand the resin particles in bulk expansion ratio of 42, obtaining composite resin pre-expanded particles.
(Production of a Composite Resin Expanded Molded Article)

The obtained pre-expanded particles were then left for 1 day at 25° C., and a molding cavities having a cavity with an inside dimension of 400 mm long×300 mm wide×30 mm thick was fed with the pre-expanded particles. 0.23 MPa of steam was introduced into the molding cavities for 50 sec. so as to heat the pre-expanded particles; and then the pre-expanded particles were cooled until an expanded molded article having 0.001 MPa of a highest surface pressure was obtained.

The obtained composite resin expanded molded article was measured for expansion ratio, a layer thickness, and blackness, resulting in good blackness and less color unevenness.

The results thereby obtained as well as raw materials and production conditions will be indicated in Table 1.

FIG. 1 exhibits a microscope image indicating the measurement results of the outermost layer thickness of a slice of the expanded molded article obtained by expanding and molding the pre-expanded particles of Example 1.

Figure 3:
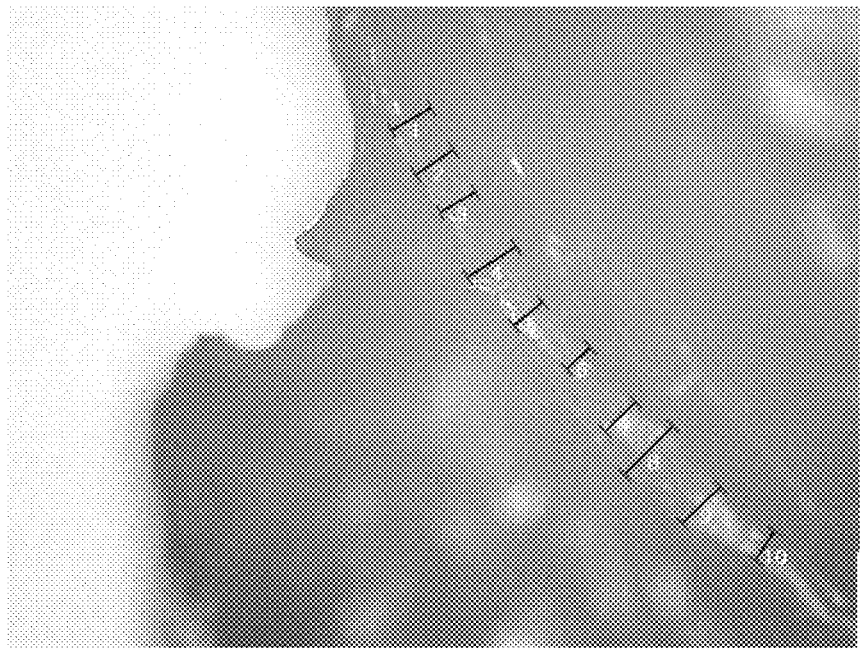
FIG. 3 exhibits a microscope image indicating measurement results of a fused-layer thickness of the slice of the expanded molded article obtained by expanding and molding the pre-expanded particles of Example 1.

FIG. 3 exhibits a microscope image indicating the measurement results of the fused-layer thickness of a slice of the expanded molded article obtained by expanding and molding the pre-expanded particles of Example 1.

Example 2

(Production of Nucleus Resin Particles)

In the same manner as in Example 1, spherical carbon black-containing polypropylene-based resin particles were obtained.
(Production of Carbon Black-containing Composite Resin Particles)
(Production of a Suspension)

In the same manner as in Example 1, a suspension was obtained.

(1st Polymerization)

In the same manner as in Example 1, a 1st polymerization was carried out.
(2nd Polymerization)

The reaction solution was then cooled to 70° C.; and 2.7 g of sodium dodecyl benzenesulfonate as a surfactant was added to the reaction solution. 230 g of a styrene monomer, in which 0.5 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.
(3rd Polymerization)

The reaction solution was then cooled to 70° C.; and 230 g of a styrene monomer, in which 0.5 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.
(4th Polymerization)

The reaction solution was then cooled to 70° C.; and 230 g of a styrene monomer, in which 0.5 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.
(5th Polymerization)

The reaction solution was then cooled to 70° C.; and 230 g of a styrene monomer, in which 0.5 g of dicumyl peroxide was already dissolved as a polymerization initiator, was added dropwise to the reaction solution over 30 min. The reaction solution was then heated to 140° C. and was retained at the same temperature for 3.5 hours to polymerize the styrene monomer in the carbon black-containing polypropylene-based resin particles, obtaining carbon black-containing composite resin particles.
(Flame-retardant Process)

In the same manner as in Example 1, the carbon black-containing composite resin particles subjected to the flame-retardant treatment were obtained.

In the same manner as in Example 1, (Production of expandable composite resin particles), (Production of composite resin pre-expanded particles), and (Production of a composite resin expanded molded article) were carried out; and the obtained composite resin expanded molded article was measured for expansion ratio, a layer thickness, and blackness, resulting in good blackness and less color unevenness.

The results thereby obtained as well as raw materials and production conditions will be indicated in Table 1.

Example 3

(Production of Nucleus Resin Particles)

1,700 g of a polypropylene-based resin (manufactured by Prime Polymer Co., Ltd.; trade name "Prime Polypro (Film)"; brand name "F-744NP") and 300 g of furnace black as a black colorant (manufactured by Mitsubishi Chemical Corporation; trade name "Mitsubishi carbon black"; brand name "Intermediate color (MCF) #900") were poured into a tumbler mixer and mixed for 7 min.

The obtained mixture was then supplied into an extruder (manufactured by Toshiba Machine Co., Ltd.; model No.: SE-65) and was heated and melted to be extruded in the form of granulated pellets by an underwater cutting method, obtaining spherical carbon black-containing polypropylene-based resin particles in which the polypropylene-based resin comprises 15% by mass of the furnace black. These resin particles were adjusted to be 80 mg per 100 particles and to be about 1 mm in average particle diameter.

(Production of Carbon Black-containing Composite Resin Particles)
(Production of a Suspension)

400 g of the obtained carbon black-containing polypropylene-based resin particles were then placed in. a 5-liter autoclave equipped with a stirrer (manufactured by Nitto Kouatsu); and 2,000 g of pure water as an aqueous medium, 20 g of magnesium pyrophosphate as a dispersant, and 0.2 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.

(1st Polymerization)

200 g of a styrene monomer, in which 0.5 g of dicumyl peroxide was already dissolved as a polymerization initiator, was then added dropwise to the obtained suspension over 30 min. This reaction solution was then heated to 140° C. and was retained at the same temperature for 2 hours to polymerize the styrene monomer in the carbon black-containing polypropylene-based resin particles.

(2nd Polymerization)

The reaction solution was then cooled to 70° C.; and 3.0 g of sodium dodecyl benzenesulfonate as a surfactant was added to the reaction solution. 460 g of a styrene monomer, in which 1.2 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.

(3rd Polymerization)

The reaction solution was then cooled to 70° C.; and 470 g of a styrene monomer, in which 1.2 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.

(4th Polymerization)

The reaction solution was then cooled to 70° C.; and 470 g of a styrene monomer, in which 1.2 g of dicumyl peroxide was already dissolved as a polymerization initiator, was added dropwise to the reaction solution over 30 min. The reaction solution was then heated to 140° C. and was retained at the same temperature for 3.5 hours to polymerize the styrene monomer in the carbon black-containing polypropylene-based resin particles, obtaining carbon black-containing composite resin particles.

(Flame-retardant Process)

In the same manner as in Example 1, the carbon black-containing composite resin particles subjected to the flame-retardant treatment were obtained.

In the same manner as in Example 1, (Production of expandable composite resin particles), (Production of composite resin pre-expanded particles), and (Production of a composite resin expanded molded article) were carried out; and the obtained composite resin expanded molded article was measured for expansion ratio, a layer thickness, and blackness, resulting in good blackness and less color unevenness.

The results thereby obtained as well as raw materials and production conditions will be indicated in Table 1.

Example 4

(Production of Nucleus Resin Particles)

In the same manner as in Example 1, spherical carbon black-containing polypropylene-based resin particles were obtained.

(Production of Carbon Black-containing Composite Resin Particles)
(Production of a Suspension)

1,000 g of the obtained carbon black-containing polypropylene-based resin particles were then placed in a 5-liter autoclave equipped with a stirrer (manufactured by Nitto Kouatsu); and 2,000 g of pure water as an aqueous medium, 20 g of magnesium pyrophosphate as a dispersant, and 0.5 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.

(1st Polymerization)

420 g of a styrene monomer, in which 0.8 g of dicumyl peroxide was already dissolved as a polymerization initiator, was then added dropwise to the obtained suspension over 30 min. This reaction solution was then heated to 140° C. and was retained at the same temperature for 2 hours to polymerize the styrene monomer in the carbon black-containing polypropylene-based resin particles.

(2nd Polymerization)

The reaction solution was then cooled to 70° C.; and 2.7 g of sodium dodecyl benzenesulfonate as a surfactant was added to the reaction solution. 193 g of a styrene monomer, in which 0.4 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.

(3rd Polymerization)

The reaction solution was then cooled to 70° C.; and 193 g of a styrene monomer, in which 0.4 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.

(4th Polymerization)

The reaction solution was then cooled to 70° C.; and 193 g of a styrene monomer, in which 0.4 g of dicumyl peroxide was already dissolved as a polymerization initiator, was added dropwise to the reaction solution over 30 min. The reaction solution was then heated to 140° C. and was retained at the same temperature for 3.5 hours to polymerize the styrene monomer in the carbon black-containing polypropylene-based resin particles, obtaining carbon black-containing composite resin particles.

(Flame-retardant Process)

In the same manner as in Example 1, the carbon black-containing composite resin particles subjected to the flame-retardant treatment were obtained.

(Production of Expandable Composite Resin Pparticles)

In the same manner as in Example 1, 2,100 g of expandable carbon black-containing composite resin particles were obtained.

(Production of Composite Resin Pre-expanded Particles)

1,000 g of the obtained expandable carbon black-containing composite resin particles were then poured into a 40-liter pre-expansion machine (manufactured by Kasahara Industry Co., Ltd.; model No.: PSX40), and a gauge pressure 0.06 MPa of steam was introduced into the machine so as to heat and pre-expand the resin particles in bulk expansion ratio of 19, obtaining composite resin pre-expanded particles.

(Production of a Composite Resin Expanded Molded Article)

The obtained pre-expanded particles were then left for 1 day at 25° C., and a molding cavities having a cavity with an inside dimension of 400 mm long×300 mm wide×30 mm thick was fed with the pre-expanded particles. 0.23 MPa of steam was introduced into the molding cavities for 55 sec. so as to heat the pre-expanded particles; and then the pre-expanded particles were cooled until an expanded molded article having 0.001 MPa of a highest surface pressure was obtained.

The obtained composite resin expanded molded article was measured for expansion ratio, a layer thickness, and blackness, resulting in good blackness and less color unevenness.

The results thereby obtained as well as raw materials and production conditions will be indicated in Table 1.

Example 5

(Production of Nucleus Resin Particles)

In the same manner as in Example 1, spherical carbon black-containing polypropylene-based resin particles were obtained.

(Production of Carbon Black-Containing Composite Resin Particles)

(Production of a Suspension)

In the same manner as in Example 1, a suspension was obtained.

(1st Polymerization)

320 g of a styrene monomer, in which 0.6 g of dicumyl peroxide was already dissolved as a polymerization initiator, was then added dropwise to the obtained suspension over 30 min. This reaction solution was then heated to 140° C. and was retained at the same temperature for 2 hours to polymerize the styrene monomer in the carbon black-containing polypropylene-based resin particles.

(2nd Polymerization)

The reaction solution was then cooled to 70° C.; and 2.7 g of sodium dodecyl benzenesulfonate as a surfactant was added to the reaction solution. 460 g of a styrene monomer, in which 0.9 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.

(3rd Polymerization)

The reaction solution was then cooled to 70° C.; and 460 g of a styrene monomer, in which 0.9 g of dicumyl peroxide was already dissolved as a polymerization initiator, was added dropwise to the reaction solution over 30 min. The reaction solution was then heated to 140° C. and was retained at the same temperature for 3.5 hours to polymerize the styrene monomer in the carbon black-containing polypropylene-based resin particles, obtaining carbon black-containing composite resin particles.

(Flame-retardant Process)

In the same manner as in Example 1, the carbon black-containing composite resin particles subjected to the flame-retardant treatment were obtained.

In the same manner as in Example 1, (Production of expandable composite resin particles), (Production of composite resin pre-expanded particles), and (Production of a composite resin expanded molded article) were carried out; and the obtained composite resin expanded molded article was measured for expansion ratio, a layer thickness, and blackness, resulting in good blackness and less color unevenness.

The results thereby obtained as well as raw materials and production conditions will be indicated in Table 1.

Example 6

(Production of Nucleus Resin Particles)

In the same manner as in Example 1, spherical carbon black-containing polypropylene-based resin particles were obtained.

(Production of Carbon Black-Containing Composite Resin Pparticles)

In the same manner as in Example 1, (Production of a suspension), (1st polymerization) to (5th polymerization), and (Flame-retardant process) were carried out; and the carbon black-containing composite resin particles subjected to the flame-retardant treatment were obtained.

(Production of Expandable Composite Resin Particles)

In the same manner as in Example 1, 2,100 g of expandable carbon black-containing composite resin particles were obtained.

(Production of Composite Resin Pre-expanded Particles)

1,000 g of the obtained expandable carbon black-containing composite resin particles were then poured into a 40-liter pre-expansion machine (manufactured by Kasahara Industry Co., Ltd.; model No.: PSX40), and a gauge pressure 0.04 MPa of steam was introduced into the machine so as to heat and pre-expand the resin particles in bulk expansion ratio of 11, obtaining composite resin pre-expanded particles.

(Production of a Composite Resin Expanded Molded Article)

The obtained pre-expanded particles were then left for 1 day at 25° C., and a molding cavities having a cavity with an inside dimension of 400 mm long×300 mm wide×30 mm thick was fed with the pre-expanded particles. 0.25 MPa of steam was introduced into the molding cavities for 50 sec. so as to heat the pre-expanded particles; and then the pre-expanded particles were cooled until an expanded molded article having 0.001 MPa of a highest surface pressure was obtained.

The obtained composite resin expanded molded article was measured for expansion ratio, a layer thickness, and blackness, resulting in good blackness and less color unevenness.

The results thereby obtained as well as raw materials and production conditions will be indicated in Table 1.

Example 7

(Production of Nucleus Resin Particles)

In the same manner as in Example 1, spherical carbon black-containing polypropylene-based resin particles were obtained.

(Production of Carbon Black-containing Composite Resin Particles)

In the same manner as in Example 1, (Production of a suspension), (1st polymerization) to (5th polymerization), and (Flame-retardant process) were carried out; and the carbon black-containing composite resin particles subjected to the flame-retardant treatment were obtained.

(Production of Expandable Composite Resin Particles)

In the same manner as in Example 1, 2,100 g of expandable carbon black-containing composite resin particles were obtained.

(Production of Composite Resin Pre-expanded Particles)

1,000 g of the obtained expandable carbon black-containing composite resin particles were then poured into a 40-liter pre-expansion machine (manufactured by Kasahara Industry Co., Ltd.; model No.: PSX40), and a gauge pressure 0.04 MPa of steam was introduced into the machine so as to heat and pre-expand the resin particles in bulk expansion ratio of 6, obtaining composite resin pre-expanded particles.

(Production of a Composite Resin Expanded Molded Article)

The obtained pre-expanded particles were then left for 1 day at 25° C., and a molding cavities having a cavity with an inside dimension of 400 mm long×300 mm wide×30 mm thick was fed with the pre-expanded particles. 0.25 MPa of steam was introduced into the molding cavities for 50 sec. so as to heat the pre-expanded particles; and then the pre-expanded particles were cooled until an expanded molded article having 0.001 MPa of a highest surface pressure was obtained.

The obtained composite resin expanded molded article was measured for expansion ratio, a layer thickness, and blackness, resulting in good blackness and less color unevenness.

The results thereby obtained as well as raw materials and production conditions will be indicated in Table 1.

Example 8

(Production of Nucleus Resin Particles)

1,940 g of a linear chain low-density polyethylene-based resin (manufactured by Japan Polyethylene Corporation; trade name "Harmorex"; brand name "NF-464A"; a melting point of 124° C.) and 60 g of a furnace black as a black colorant (manufactured by Mitsubishi Chemical Corporation; trade name "Mitsubishi carbon black"; brand name "Intermediate color (MCF) #900") were poured into a tumbler mixer and mixed for 7 min.

The obtained mixture was then supplied into an extruder (manufactured by Toshiba Machine Co., Ltd.; model No.: SE-65) and was heated and melted to be extruded in the form of granulated pellets by an underwater cutting method, obtaining spherical carbon black-containing linear chain low-density polyethylene-based resin particles in which the linear chain low-density polyethylene-based resin comprises 3% by mass of the furnace black. These resin particles were adjusted to be 70 mg per 100 particles and to be about 1 mm in average particle diameter.

(Production of Carbon Black-containing Composite Resin Particles)

(Production of a Suspension)

600 g of the obtained carbon black-containing linear chain low-density polyethylene-based resin particles were then placed in a 5-liter autoclave equipped with a stirrer (manufactured by Nitto Kouatsu); and 2,000 g of pure water as an aqueous medium, 20 g of magnesium pyrophosphate as a dispersant, and 0.3 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.

(1st Polymerization)

282 g of a styrene monomer, in which 0.6 g of dicumyl peroxide was already dissolved as a polymerization initiator, was then added dropwise to the obtained suspension over 30 min. This reaction solution was then heated to 135° C. and was retained at the same temperature for 2 hours to polymerize the styrene monomer in the carbon black-containing linear chain low-density polyethylene-based resin particles.

(2nd Polymerization)

The reaction solution was then cooled to 70° C.; and 2.9 g of sodium dodecyl benzenesulfonate as a surfactant was added to the reaction solution. 373 g of a styrene monomer, in which 0.7 g of dicumyl peroxide was already dissolved as a polymerization initiator, was added dropwise to the reaction solution over 30 min. The reaction solution was then heated to 135° C. and was retained at the same temperature for 2 hours to polymerize the styrene monomer in the carbon black-containing linear chain low-density polyethylene-based resin particles.

(3rd Polymerization)

The reaction solution was then cooled to 70° C.; and 373 g of a styrene monomer, in which 0.7 g of dicumyl peroxide was already dissolved as a polymerization initiator, was added dropwise to the reaction solution over 30 min. The reaction solution was then heated to 135° C. and was retained at the same temperature for 2 hours to polymerize the styrene monomer in the carbon black-containing linear chain low-density polyethylene-based resin particles.

(4th Polymerization)

The reaction solution was then cooled to 70° C.; and 373 g of a styrene monomer, in which 0.7 g of dicumyl peroxide was already dissolved as a polymerization initiator, was added dropwise to the reaction solution over 30 min. The reaction solution was then heated to 140° C. and was retained at the same temperature for 3.5 hours to polymerize the styrene monomer in the carbon black-containing linear chain low-density polyethylene-based resin particles, obtaining carbon black-containing composite resin particles.

(Flame-retardant Process)

The reaction solution was then cooled to 60° C.; and 60 g of tri(2,3-dibromopropyl)isocyanate (manufactured by Nippon Kasei Chemical Co., Ltd.) as a flame retardant and 30 g of 2,3-dimethyl-2,3-diphenyl butane (manufactured by Kayaku Akzo Corporation) as a flame-retardant auxiliary agent were added to the reaction solution. The reaction solution was then heated to 140° C. and was retained at the same temperature for 4 hours while being stirred so that the carbon black-containing composite resin particles were subjected to a flame-retardant treatment.

The reaction solution was then cooled to 25° C. and then was subjected to acid washing by using a 20% hydrochloric acid aqueous solution to eliminate the dispersant, so that 2,000 g of the carbon black-containing composite resin particles were taken out from the autoclave.

(Production of Expandable Composite Resin Particles)

2,000 g of the carbon black-containing composite resin particles and 2,000 g of water were then poured again into the 5-liter autoclave equipped with a stirrer, and 300 g of butane as a blowing agent (normal butane: isobutane=7:3) was added thereto. The mixture was then heated to 70° C. and was retained at the same temperature for 4 hours while being stirred.

The mixture was then cooled to 25° C., and the carbon black-containing composite resin particles were taken out from the autoclave and were dehydrated and dried to obtain 2,100 g of expandable carbon black-containing composite resin particles.
(Production of Composite Resin Pre-expanded Particles)

1,000 g of the obtained expandable carbon black-containing composite resin particles were then poured into a pre-expansion machine (manufactured by Sekisui Machinery Co., Ltd.; trade name: SKK-70), and a gauge pressure 0.02 MPa of steam was introduced into the machine so as to heat and pre-expand the resin particles in bulk expansion ratio of 21, obtaining composite resin pre-expanded particles.
(Production of a Composite Resin Expanded Molded Article)

The obtained pre-expanded particles were then left for 1 day at 25° C., and a molding cavities having a cavity with an inside dimension of 400 mm long×300 mm wide×30 mm thick was fed with the pre-expanded particles. 0.07 MPa of steam was introduced into the molding cavities for 50 sec. so as to heat the pre-expanded particles; and then the pre-expanded particles were cooled until an expanded molded article having 0.001 MPa of a highest surface pressure was obtained.

The obtained composite resin expanded molded article was measured for expansion ratio, a layer thickness, and blackness, resulting in good blackness and less color unevenness.

The results thereby obtained as well as raw materials and production conditions will be indicated in Table 1.

Comparative Example 1

(Production of Nucleus Resin Particles)

In the same manner as in Example 1, spherical carbon black-containing polypropylene-based resin particles were obtained.
(Production of Carbon Black-containing Composite Resin Particles)
(Production of a Suspension)

800 g of the obtained carbon black-containing polypropylene-based resin particles were then placed in a 5-liter autoclave equipped with a stirrer (manufactured by Nitto Kouatsu); and 2,000 g of pure water as an aqueous medium, 20 g of magnesium pyrophosphate as a dispersant, and 0.5 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.
(1st Polymerization)

340 g of a styrene monomer, in which 0.7 g of dicumyl peroxide was already dissolved as a polymerization initiator, was then added dropwise to the obtained suspension over 30 min. so that the carbon black-containing polypropylene-based resin particles absorb the styrene monomer. This reaction solution was then heated to 140° C. and was retained at the same temperature for 2 hours to polymerize the styrene monomer in the carbon black-containing polypropylene-based resin particles.
(2nd Polymerization)

The reaction solution was then cooled to 120° C. that is 20° C. lower than the melting point of the polypropylene-based resin in the carbon black-containing polypropylene-based resin particles, and 1.5 g of sodium dodecyl benzenesulfonate as a surfactant was added to the reaction solution. 860 g of a styrene monomer, in which 3.6 g of dicumyl peroxide was already dissolved as a polymerization initiator, was added dropwise to the reaction solution over 4 hours so that the carbon black-containing polypropylene-based resin particles absorb the styrene monomer; and the styrene monomer polymerizes therein. After the completion of the dropping, the reaction solution was retained at 120° C. for 1 hour and was then heated to 140° C. and retained for 3 hours to complete the polymerization, obtaining carbon black-containing composite resin particles.
(Flame-retardant Process)

In the same manner as in Example 1, the carbon black-containing composite resin particles subjected to the flame-retardant treatment were obtained.

In the same manner as in Example 1, (Production of expandable composite resin particles), (Production of composite resin pre-expanded particles), and (Production of a composite resin expanded molded article) were carried out; and the obtained composite resin expanded molded article was measured for expansion ratio, a layer thickness, and blackness.

The results thereby obtained as well as raw materials and production conditions will be indicated in Table 2.

Figure 2:
FIG. 2 exhibits a microscope image indicating measurement results of an outermost layer thickness of a slice of an expanded molded article obtained by expanding and molding pre-expanded particles of Comparative Example 1.

FIG. 2 exhibits a microscope image indicating the measurement results of the outermost layer thickness of a slice of the expanded molded article obtained by expanding and molding the pre-expanded particles of Comparative Example 1.

Figure 4:
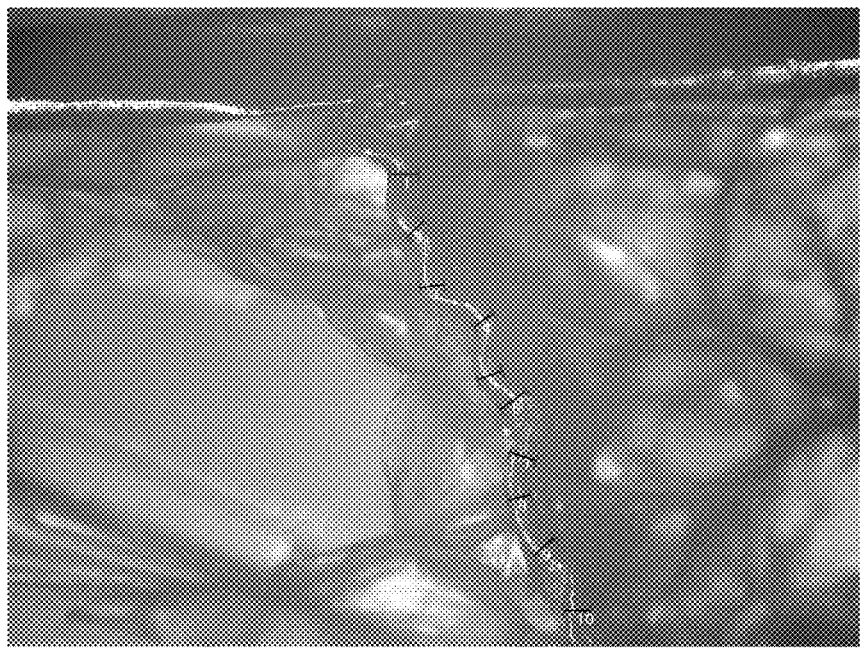
FIG. 4 exhibits a microscope image indicating measurement results of a fused-layer thickness of the slice of the expanded molded article obtained by expanding and molding the pre-expanded particles of Comparative Example 1.
Figure 5:
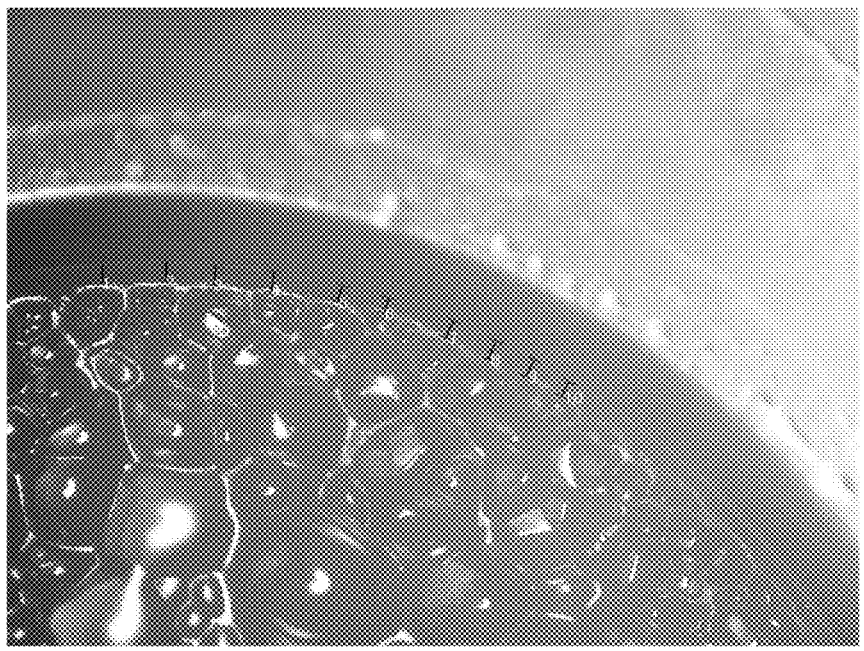
FIG. 5 exhibits a microscope image of the slice of the pre-expanded particles of Example 1.
Figure 6:
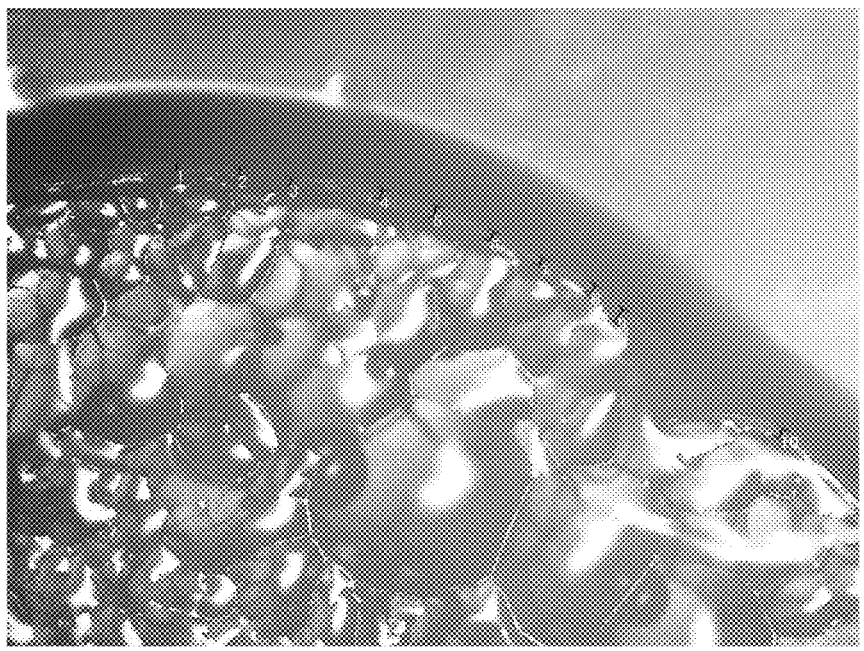
FIG. 6 exhibits a microscope image of the slice of the pre-expanded particles of Comparative Example 1.

FIG. 4 exhibits a microscope image indicating the measurement results of the fused-layer thickness of a slice of the expanded molded article obtained by expanding and molding the pre-expanded particles of Comparative Example 1.

Comparative Example 2

(Production of Nucleus Resin Particles)

In the same manner as in Example 1, spherical carbon black-containing polypropylene-based resin particles were obtained.
(Production of Carbon Black-Containing Composite Resin Pparticles)
(Production of a Suspension)

360 g of the obtained carbon black-containing polypropylene-based resin particles were then placed in a 5-liter autoclave equipped with a stirrer (manufactured by Nitto Kouatsu); and 2,000 g of pure water as an aqueous medium, 20 g of magnesium pyrophosphate as a dispersant, and 0.2 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.
(1st Polymerization)

180 g of a styrene monomer, in which 0.5 g of dicumyl peroxide was already dissolved as a polymerization initiator, was then added dropwise to the obtained suspension over 30 min. This reaction solution was then heated to 140° C. and was retained at the same temperature for 2 hours to polymerize the styrene monomer in the carbon black-containing polypropylene-based resin particles.
(2nd Polymerization)

The reaction solution was then cooled to 70° C.; and 3.0 g of sodium dodecyl benzenesulfonate as a surfactant was added to the reaction solution. 487 g of a styrene monomer, in which 1.2 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.

(3rd Polymerization)

The reaction solution was then cooled to 70° C.; and 487 g of a styrene monomer, in which 1.2 g of dicumyl peroxide was already dissolved as a polymerization initiator, was added dropwise to the reaction solution over 30 min. The reaction solution was then heated to 140° C. and was retained at the same temperature for 2 hours to polymerize the styrene monomer in the carbon black-containing polypropylene-based resin particles.

(4th Polymerization)

The reaction solution was then cooled to 70° C.; and 487 g of a styrene monomer, in which 1.2 g of dicumyl peroxide was already dissolved as a polymerization initiator, was added dropwise to the reaction solution over 30 min. The reaction solution was then heated to 140° C. and was retained at the same temperature for 3.0 hours to polymerize the styrene monomer in the carbon black-containing polypropylene-based resin particles, obtaining carbon black-containing composite resin particles.

(Flame-retardant Process)

In the same manner as in Example 1, the carbon black-containing composite resin particles subjected to the flame-retardant treatment were obtained.

(Production of Expandable Composite Resin Particles)

In the same manner as in Example 1, expandable composite resin particles were obtained.

(Production of Composite Resin Pre-expanded Particles)

1,000 g of the obtained expandable carbon black-containing composite resin particles were then poured into a 40-liter pre-expansion machine (manufactured by Kasahara Industry Co., Ltd.; model No.: PSX40), and a gauge pressure 0.02 MPa of steam was introduced into the machine so as to heat and pre-expand the resin particles in bulk expansion ratio of 26, obtaining composite resin pre-expanded particles.

(Production of a Composite Resin Expanded Molded Article)

In the same manner as in Example 1, an expanded molded article was obtained.

The obtained composite resin expanded molded article was measured for expansion ratio, a layer thickness, and blackness.

The results thereby obtained as well as raw materials and production conditions will be indicated in Table 2.

Comparative Example 3

Composite resin pre-expanded particles were obtained in the same manner as in (Production of composite resin pre-expanded particles) of Comparative Example 2, except that a gauge pressure 0.05 MPa of steam was introduced into the machine so as to heat and pre-expand the expandable carbon black-containing composite resin particles in bulk expansion ratio of 42 and then to obtain an expanded molded article.

The obtained composite resin expanded molded article was measured for expansion ratio, a layer thickness, and blackness.

The results thereby obtained as well as raw materials and production conditions will be indicated in Table 2.

Comparative Example 4

(Production of Nucleus Resin Particles)

In the same manner as in Example 1, spherical carbon black-containing polypropylene-based resin particles were obtained.

(Production of Carbon Black-containing Composite Resin Particles)

(Production of a Suspension)

952 g of the obtained carbon black-containing polypropylene-based resin particles were then placed in a 5-liter autoclave equipped with a stirrer (manufactured by Nitto Kouatsu); and 2,000 g of pure water as an aqueous medium, 20 g of magnesium pyrophosphate as a dispersant, and 0.5 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.

(1st Polymerization)

400 g of a styrene monomer, in which 0.8 g of dicumyl peroxide was already dissolved as a polymerization initiator, was then added dropwise to the obtained suspension over 30 min. so that the carbon black-containing polypropylene-based resin particles absorb the styrene monomer. This reaction solution was then heated to 140° C. and was retained at the same temperature for 2 hours to polymerize the styrene monomer in the carbon black-containing polypropylene-based resin particles.

(2nd Polymerization)

The reaction solution was then cooled to 120° C. that is 20° C. lower than the melting point of the polypropylene-based resin in the carbon black-containing polypropylene-based resin particles, and 2.7 g of sodium dodecyl benzenesulfonate as a surfactant was added to the reaction solution. 648 g of a styrene monomer, in which 3.1 g of dicumyl peroxide was already dissolved as a polymerization initiator, was added dropwise to the reaction solution over 4 hours so that the carbon black-containing polypropylene-based resin particles absorb the styrene monomer; and the styrene monomer polymerizes therein. After the completion of the dropping, the reaction solution was retained at 120° C. for 1 hour and was then heated to 140° C. and retained for 3 hours to complete the polymerization, obtaining carbon black-containing composite resin particles.

(Flame-retardant Process)

In the same manner as in Example 1, the carbon black-containing composite resin particles subjected to the flame-retardant treatment were obtained.

(Production of Expandable Composite Resin Particles)

In the same manner as in Example 1, expandable composite resin particles were obtained.

(Production of Complete Resin Pre-expanded Particles)

1,000 g of the obtained expandable carbon black-containing composite resin particles were then poured into a 40-liter pre-expansion machine (manufactured by Kasahara Industry Co., Ltd.; model No.: PSX40), and a gauge pressure 0.03 MPa of steam was introduced into the machine so as to heat and pre-expand the resin particles in bulk expansion ratio of 44, obtaining composite resin pre-expanded particles.

(Production of a Composite Resin Expanded Molded Article)

In the same manner as in Example 1, an expanded molded article was obtained.

The obtained composite resin expanded molded article was measured for expansion ratio, a layer thickness, and blackness.

The results thereby obtained as well as raw materials and production conditions will be indicated in Table 2.

Comparative Example 5

(Production of Nucleus Resin Particles)
In the same manner as in Example 1, spherical carbon black-containing polypropylene-based resin particles were obtained.
(Production of Carbon Black-containing Composite Resin Particles)
(Production of a Suspension)
910 g of the obtained carbon black-containing polypropylene-based resin particles were then placed in a 5-liter autoclave equipped with a stirrer (manufactured by Nitto Kouatsu); and 2,000 g of pure water as an aqueous medium, 20 g of magnesium pyrophosphate as a dispersant, and 0.5 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.
(1st Polymerization)
382 g of a styrene monomer, in which 0.8 g of dicumyl peroxide was already dissolved as a polymerization initiator, was then added dropwise to the obtained suspension over 30 min. This reaction solution was then heated to 140° C. and was retained at the same temperature for 2 hours to polymerize the styrene monomer in the carbon black-containing polypropylene-based resin particles.
(2nd Polymerization)
The reaction solution was then cooled to 70° C.; and 2.7 g of sodium dodecyl benzenesulfonate as a surfactant was added to the reaction solution. 354 g of a styrene monomer, in which 0.5 g of dicumyl peroxide was already dissolved as a polymerization initiator, was added dropwise to the reaction solution over 30 min. This reaction solution was then heated to 140° C. and was retained at the same temperature for 2 hours to polymerize the styrene monomer in the carbon black-containing polypropylene-based resin particles.
(3rd Polymerization)
The reaction solution was then cooled to 70° C.; and 354 g of a styrene monomer, in which 0.5 g of dicumyl peroxide was already dissolved as a polymerization initiator, was added dropwise to the reaction solution over 30 min. The reaction solution was then heated to 140° C. and was retained at the same temperature for 3.5 hours to polymerize the styrene monomer in the carbon black-containing polypropylene-based resin particles, obtaining carbon black-containing composite resin particles.
(Flame-retardant Process)
In the same manner as in Example 1, the carbon black-containing composite resin particles subjected to the flame-retardant treatment were obtained.
(Production of Expandable Composite Resin Particles)
In the same manner as in Example 1, expandable composite resin particles were obtained.
(Production of Composite Resin Pre-expanded Particles)
1,000 g of the obtained expandable carbon black-containing composite resin particles were then poured into a 40-liter pre-expansion machine (manufactured by Kasahara Industry Co., Ltd.; model No.: PSX40), and a gauge pressure 0.06 MPa of steam was introduced into the machine so as to heat and pre-expand the resin particles in bulk expansion ratio of 74, obtaining composite resin pre-expanded particles.
(Production of a Composite Resin Expanded Molded Article)
In the same manner as in Example 1, an expanded molded article was obtained.
The obtained composite resin expanded molded article was measured for expansion ratio, a layer thickness, and blackness.
The results thereby obtained as well as raw materials and production conditions will be indicated in Table 2.

Comparative Example 6

(Production of Nucleus Resin Particles)
In the same manner as in Example 1, spherical carbon black-containing polypropylene-based resin particles were obtained.
(Production of Carbon Black-containing Composite Resin Particles)
(Production of a Suspension)
1,053 g of the obtained carbon black-containing polypropylene-based resin particles were then placed in a 5-liter autoclave equipped with a stirrer (manufactured by Nitto Kouatsu); and 2,000 g of pure water as an aqueous medium, 20 g of magnesium pyrophosphate as a dispersant, and 0.5 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.
(1st Polymerization)
422 g of a styrene monomer, in which 0.9 g of dicumyl peroxide was already dissolved as a polymerization initiator, was then added dropwise to the obtained suspension over 30 min. This reaction solution was then heated to 140° C. and was retained at the same temperature for 2 hours to polymerize the styrene monomer in the carbon black-containing polypropylene-based resin particles.
(2nd Polymerization)
The reaction solution was then cooled to 70° C.; and 2.7 g of sodium dodecyl benzenesulfonate as a surfactant was added to the reaction solution. 253 g of a styrene monomer, in which 0.5 g of dicumyl peroxide was already dissolved as a polymerization initiator, was added dropwise to the reaction solution over 30 min. This reaction solution was then heated to 140° C. and was retained at the same temperature for 2 hours to polymerize the styrene monomer in the carbon black-containing polypropylene-based resin particles.
(3rd Polymerization)
The reaction solution was then cooled to 70° C.; and 253 g of a styrene monomer, in which 0.5 g of dicumyl peroxide was already dissolved as a polymerization initiator, was added dropwise to the reaction solution over 30 min. The reaction solution was then heated to 140° C. and was retained at the same temperature for 3.5 hours to polymerize the styrene monomer in the carbon black-containing polypropylene-based resin particles, obtaining carbon black-containing composite resin particles.
(Flame-retardant Process)
In the same manner as in Example 1, the carbon black-containing composite resin particles subjected to the flame-retardant treatment were obtained.
(Production of Expandable Composite Resin Particles)
In the same manner as in Example 1, expandable composite resin particles were obtained.
(Production of Composite Resin Pre-expanded Particles)
1,000 g of the obtained expandable carbon black-containing composite resin particles were then poured into a 40-liter pre-expansion machine (manufactured by Kasahara Industry Co., Ltd.; model No.: PSX40, and a gauge pressure 0.02 MPa of steam was introduced into the machine so as to heat and pre-expand the resin particles in bulk expansion ratio of 5, obtaining composite resin pre-expanded particles.
(Production of a Composite Resin Expanded Molded Article)

The composite resin particles did not easily fuse together, and an expanded molded article having a good surface could not be obtained, even though Example 1 was carried out.

Comparative Example 7

(Production of Nucleus Resin Particles)
In the same manner as in Example 8, spherical carbon black-containing linear chain low-density polyethylene-based resin particles were obtained.
(Production of Carbon Black-containing Composite Resin Particles)
(Production of a Suspension)
600 g of the obtained carbon black-containing linear chain low-density polyethylene-based resin particles were then placed in a 5-liter autoclave equipped with a stirrer (manufactured by Nitto Kouatsu); and 2,000 g of pure water as an aqueous medium, 20 g of magnesium pyrophosphate as a dispersant, and 0.3 g of sodium dodecyl benzenesulfonate as a surfactant were added thereto. The obtained mixture was stirred and suspended in the aqueous medium, and then the mixture was retained for 10 min. at 25° C. and was heated to 70° C. to obtain a suspension.
(1st Polymerization)
282 g of a styrene monomer, in which 0.6 g of dicumyl peroxide was already dissolved as a polymerization initiator, was then added dropwise to the obtained suspension over 30 min. This reaction solution was then heated to 135° C. and was retained at the same temperature for 2 hours to polymerize the styrene monomer in the carbon black-containing linear chain low-density polyethylene-based resin particles.
(2nd Polymerization)
The reaction solution was then cooled to 125° C.; and 2.9 g of sodium dodecyl benzenesulfonate as a surfactant was added to the reaction solution. 1,118 g of a styrene monomer, in which 5.0 g of dicumyl peroxide was already dissolved as a polymerization initiator, was added dropwise to the reaction solution over 300 min. This reaction solution was then heated to 140° C. and was retained at the same temperature for 2 hours to polymerize the styrene monomer in the carbon black-containing linear chain low-density polyethylene-based resin particles.

(Flame-retardant Process)
The reaction solution was then cooled to 60° C.; and 60 g of tri(2,3-dibromopropyl)isocyanate (manufactured by Nippon Kasei. Chemical Co., Ltd.) as a flame retardant and 30 g of 2,3-dimethyl-2,3-diphenyl butane (manufactured by Kayaku Akzo Corporation) as a flame-retardant auxiliary agent were added to the reaction solution. The reaction solution was then heated to 140° C. and was retained at the same temperature for 4 hours while being stirred so that the carbon black-containing composite resin particles were subjected to a flame-retardant treatment.

The reaction solution was then cooled to 25° C. and then was subjected to acid washing by using a 20% hydrochloric acid aqueous solution to eliminate the dispersant, so that 2,000 g of the carbon black-containing composite resin particles were taken out from the autoclave.
(Production of Expandable Composite Resin Particles)
2,000 g of the carbon black-containing composite resin particles and 2,000 g of water were then poured again into the 5-liter autoclave equipped with a stirrer, and 300 g of butane as a blowing agent (normal butane : isobutane=7:3) was added thereto. The mixture was then heated to 70° C. and was retained at the same temperature for 4 hours while being stirred.

The mixture was then cooled to 25° C., and the carbon black-containing composite resin particles were taken out from the autoclave and were dehydrated and dried to obtain 2,100 g of expandable carbon black-containing composite resin particles.
(Production of Composite Resin Pre-expanded Particles)
1,000 g of the obtained expandable carbon black-containing composite resin particles were then poured into a pre-expansion machine (manufactured by Sekisui Machinery Co., Ltd.; trade name: SKK-70), and a gauge pressure 0.02 MPa of steam was introduced into the machine so as to heat and pre-expand the resin particles in bulk expansion ratio of 32, obtaining composite resin pre-expanded particles.
(Production of a Composite Resin Expanded Molded Article)

The obtained pre-expanded particles were then left for 1 day at 25° C., and a molding cavities having a cavity with an inside dimension of 400 mm long×300 mm wide×30 mm thick was fed with the pre-expanded particles. 0.07 MPa of steam was introduced into the molding cavities for 50 sec. so as to heat the pre-expanded particles; and then the pre-expanded particles were cooled until an expanded molded article having 0.001 MPa of a highest surface pressure was obtained.

The results thereby obtained as well as raw materials and production conditions will be indicated in Table 2.

TABLE 1

| | | | Ex 1 | Ex 2 | Ex 3 | Ex4 | Ex 5 | Ex 6 | Ex 7 | Ex 8 |
|---|---|---|---|---|---|---|---|---|---|---|
| Compositions | PO (parts by mass) | 100 | 100 | 100 | 100 | 100 | 100 | 100 | 100 | 100 |
| | Melting point (° C.) of PO resin | — | 140 | 140 | 140 | 140 | 140 | 140 | 140 | 124 |
| | PS (parts by mass) [1] | 100-400 | 163 | 163 | 400 | 163 | 163 | 163 | 163 | 233 |
| | C (% by mass) [2] | 0.5-5.0 | 1.9 | 1.9 | 3 | 1.9 | 1.9 | 1.9 | 1.9 | 0.9 |
| | Flame retardant (parts by mass) [2] | 1.5-6.0 | 3.0 | 3.0 | 3.0 | 3.0 | 3.0 | 3.0 | 3.0 | 3.0 |
| | Flame-retardant auxiliary agent (parts by mass) [2] | 0.1-2.0 | 1.5 | 1.5 | 1.5 | 1.5 | 1.5 | 1.5 | 1.5 | 1.5 |
| Production | Number of multistage polymerization (how many) | — | 4 | 5 | 4 | 3 | 4 | 4 | 5 | 4 |

TABLE 1-continued

|  |  |  | Ex 1 | Ex 2 | Ex 3 | Ex 4 | Ex 5 | Ex 6 | Ex 7 | Ex 8 |
|---|---|---|---|---|---|---|---|---|---|---|
| Properties Particles | Bulk density (g/cm³) | 0.015-0.25 | 0.024 | 0.024 | 0.026 | 0.053 | 0.059 | 0.09 | 0.17 | 0.048 |
|  | Surface PS content (%) | 5-40 | 19.8 | 11.7 | 30.5 | 24.7 | 5.7 | 6.0 | 5.9 | 18.3 |
|  | Average cell diameter (μm) | 100-600 | 403 | 263 | 294 | 539 | 134 | 165 | 155 | 223 |
|  | Outermost layer thickness (μm) | 30-80 | 33.7 | 40.3 | 36.3 | 32.4 | 57.5 | 66.4 | 78.3 | 51.7 |
| Properties Molded article | Fused-layer thickness (μm) | 100-200 | 125.1 | 148.0 | 123.2 | 105.3 | 161.3 | 174.3 | 193.2 | 132.9 |
|  | Color difference: intensity L* | — | 26.6 | 25.2 | 27.9 | 27.7 | 23.2 | 23.0 | 21.1 | 26.3 |
|  | color coordinate a* | — | 0.35 | 0.45 | 0.34 | 0.31 | 0.29 | 0.23 | 0.21 | 0.41 |
|  | color coordinate b* | — | 1.11 | 1.63 | 0.75 | 0.88 | 1.30 | 0.92 | 0.88 | 0.67 |
|  | blackness ΔE' | <30 | 28.06 | 27.28 | 28.99 | 28.89 | 24.79 | 24.10 | 22.09 | 27.4 |
|  | standard deviation σ | <1.0 | 0.80 | 0.74 | 0.93 | 0.53 | 0.64 | 0.32 | 0.23 | 0.43 |
|  | evaluation | — | ○ | ○ | ○ | ○ | ○ | ○ | ○ | ○ |
|  | Evaluation of flame retardancy | — | ○ | ○ | ○ | ○ | ○ | ○ | ○ | ○ |

PO: polyolefin-based resin;
PS: polystyrene-based resin;
C: carbon black
(1) with respect to 100 parts by mass of the polyolefin-based resin
(2) with respect to 100 parts by mass of the carbon black-containing composite resin pre-expanded particles

TABLE 2

|  |  |  | Comp Ex 1 | Comp Ex 2 | Comp Ex 3 | Comp Ex 4 | Comp Ex 5 | Comp Ex 6 | Comp Ex 7 |
|---|---|---|---|---|---|---|---|---|---|
| Compositions | PO (parts by mass) | 100 | 100 | 100 | 100 | 100 | 100 | 100 | 100 |
|  | Melting point (° C.) of PO resin | — | 140 | 140 | 140 | 140 | 140 | 140 | 124 |
|  | PS (parts by mass) (1) | 100-400 | 150 | 456 | 456 | 110 | 120 | 90 | 233 |
|  | C (% by mass) (2) | 0.5-5.0 | 2 | 0.9 | 0.9 | 2.4 | 2.3 | 2.6 | 0.9 |
|  | Flame retardant (parts by mass) (2) | 1.5-6.0 | 3.0 | 3.0 | 3.0 | 3.0 | 3.0 | 3.0 | 3.0 |
|  | Flame-retardant auxiliary agent (parts by mass) (2) | 0.1-2.0 | 1.5 | 1.5 | 1.5 | 1.5 | 1.5 | 1.5 | 1.5 |
| Production | Number of multistage polymerization (how many) | — | 2 | 4 | 4 | 2 | 3 | 3 | 2 |
| Properties Particles | Bulk density (g/cm³) | 0.015-0.25 | 0.024 | 0.038 | 0.024 | 0.023 | 0.014 | 0.2 | 0.031 |
|  | Surface PS content (%) | 5-40 | 41.1 | 35.3 | 35.3 | 25.4 | 20.2 | 18.4 | 24.3 |
|  | Average cell diameter (μm) | 100-600 | 300 | 93 | 457 | 82 | 632 | 58 | 553 |
|  | Outermost layer thickness (μm) | 30-80 | 20.3 | 20.6 | 12.0 | 15.4 | 13.2 | 84.2 | 16.2 |
| Properties Molded article | Fused-layer thickness (μm) | 100-200 | 82.9 | 83.2 | 66.0 | 73.4 | 68.9 | — | 57.7 |
|  | Color difference: intensity L* | — | 31.0 | 31.5 | 32.3 | 30.5 | 31.6 | — | 30.6 |
|  | color coordinate a* | — | 0.44 | 0.45 | 0.30 | 0.44 | 0.55 | — | 0.59 |
|  | color coordinate b* | — | 1.32 | 1.50 | 1.20 | 1.04 | 1.35 | — | 1.53 |
|  | blackness ΔE' | <30 | 32.76 | 33.45 | 33.80 | 31.98 | 33.50 | — | 32.72 |
|  | standard deviation σ | <1.0 | 1.40 | 2.30 | 3.12 | 1.20 | 2.34 | — | 2.6 |
|  | evaluation | — | X | X | X | X | X | — | X |
|  | Evaluation of flame retardancy | — | ○ | ○ | ○ | ○ | X | — | ○ |

PO: polyolefin-based resin;
PS: polystyrene-based resin;
C: carbon black
(1) with respect to 100 parts by mass of the polyolefin-based resin
(2) with respect to 100 parts by mass of the carbon black-containing composite resin pre-expanded particles The results indicated in Tables 1 and 2 exhibit the following findings: The outermost layer thickness of the pre-expanded particles of Examples 1 to 8 of the present invention ranges from 30 to 80 μm, and the expanded molded article obtained by using these pre-expanded particles is high in blackness; and the outermost layer thickness of the pre-expanded particles of Comparative Examples 1 to 5 and 7 is thin, and the expanded molded article obtained by using these pre-expanded particles is low in blackness. Namely, it seems that the pre-expanded particles having the outermost layer thickness of 30 to 80 μm distribute the carbon black throughout their surface even if the carbon blackcontent is low, with the result that the expanded molded article is high in blackness.

The invention claimed is:

1. A carbon black-containing composite resin pre-expanded particle
comprising a carbon black-containing polyolefin-based resin, and 100 to 400 parts by mass of a polystyrene-based resin with respect to 100 parts by mass of the carbon black-containing polyolefin-based resin;
having a carbon black content of 0.5 to 5.0% by mass and a bulk density of 0.015 to 0.25 g/cm³;
having a surface polystyrene-based resin content of 5 to 40% by mass;
wherein the carbon black-containing composite resin pre-expanded particles are 100 to 600 µm in average cell diameter; and
wherein carbon black-containing composite resin pre-expanded particle comprises
a visually observable outermost layer having a thickness of 30 to 80 µm after undergoing the following test:
(a) the carbon black-containing composite resin pre-expanded particle is sliced into a 1-mm slice in such a way that cross-section surfaces of cells are exposed on both surfaces of the slice;
(b) the obtained slice is immersed in toluene at 25° C. for 24 hours to extract a polystyrene-based resin component as described above;
(c) the cross-section surface of the slice is then subjected to magnified photographing by a microscope;
(d) the obtained microscope image is observed.

2. The carbon black-containing composite resin pre-expanded particle of claim 1, further comprising, as a flame retardant, 1.5 to 6.0 parts by mass of tri(2,3-dibromopropyl) isocyanate or bis[3,5-dibromo-4-(2,3-dibromopropoxy)phenyl] sulfone with respect to 100 parts by mass of the carbon black-containing composite resin pre-expanded particle and, as a flame-retardant auxiliary agent, 0.1 to 2.0 parts by mass of 2,3-dimethyl-2,3-diphenyl butane with respect to 100 parts by mass of the carbon black-containing composite resin pre-expanded particle.

3. The carbon black-containing composite resin pre-expanded particle of claim 1, comprising a carbon black content of 0.5 to 2.5% by mass, a bulk density of 0.015 to 0.035 g/cm³, and a visually observable outermost layer having a thickness of 30 to 45 µm as a result of the tests.

4. An expanded molded article obtained by expanding and molding a plurality of the carbon black-containing composite resin pre-expanded particles of claim 1.

5. The expanded molded article of claim 4, wherein the expanded molded article meets a relation formula represented by $$\Delta E'=|L^*+|a^*|+|b^*|<30$$

wherein $\Delta E'$ indicates blackness, $L^*$ indicates intensity, and $a^*$ and $b^*$ indicate color coordinates, in accordance with a color-difference measurement based on JIS Z8729-2004 "color specification—CIELAB and CIE-LUV color spaces" and
meets a relation of $\sigma<1.0$ wherein $\sigma$ indicates a standard deviation of the blackness $\Delta E'$.

6. The expanded molded article of claim 4, wherein the expanded molded article has a layer having a thickness of 100 to 200 µm at an interface between fused outermost layers of the carbon black-containing composite resin pre-expanded particles after undergoing the following tests:
(a') the surface of the expanded molded article is sliced into a 1-mm slice;
(b') the obtained slice is immersed in toluene at 25° C. for 24 hours to extract a polystyrene-based resin component as described above;
(c') the cross-section surface of the slice is then subjected to magnified photographing by a microscope;
(d') the obtained microscope image is observed.

7. The expanded molded article of claim 6, wherein the expanded molded article has a layer having a thickness of 105 to 165 µm at the interface between the fused outermost layers of the carbon black-containing composite resin pre-expanded particles.

8. A method for producing the carbon black-containing composite resin pre-expanded particle of claim 1, the method comprising the successive steps of:
(A) obtaining a suspension by dispersing carbon black-containing polyolefin-based resin particles in an aqueous medium comprising a dispersant;
(B) adding a styrene-based monomer and a polymerization initiator to the obtained suspension, heating the mixture to a temperature that does not substantially allow polymerization of the styrene-based monomer, and immersing the styrene-based monomer in the carbon black-containing polyolefin-based resin particles to obtain a reaction solution;
(C) heating the obtained reaction solution to temperatures of (T−10)° C. to (T+20)° C., in which T° C. indicates a melting point of a polyolefin-based resin in the carbon black-containing polyolefin-based resin particles, so as to polymerize the styrene-based monomer, and
repeating (B) and (C) processes three times or more to obtain carbon black-containing composite resin particles;
(D) immersing a blowing agent in the obtained carbon black-containing composite resin particles to obtain expandable carbon black-containing composite resin particles; and
(E) heating and pre-expanding the obtained expandable carbon black-containing composite resin particles in an reaction vessel by introducing a gauge pressure 0.004 to 0.09 MPa of steam so as to obtain carbon black-containing composite resin pre-expanded particles.

* * * * *

UNITED STATES PATENT AND TRADEMARK OFFICE
CERTIFICATE OF CORRECTION

PATENT NO. : 10,184,036 B2
APPLICATION NO. : 15/023005
DATED : January 22, 2019
INVENTOR(S) : A. Isayama et al.

It is certified that error appears in the above-identified patent and that said Letters Patent is hereby corrected as shown below:

On the Title Page

Abstract, Line 8, please change "80 pm" to -- 80 μm --

In the Claims

Column 45, Line 52 (Claim 5, Line 4) please change "+|*b*|" to -- +|b*| --

Signed and Sealed this
Twenty-seventh Day of August, 2019

Andrei Iancu
*Director of the United States Patent and Trademark Office*